(12) United States Patent
Nagaoka

(10) Patent No.: US 9,538,269 B2
(45) Date of Patent: Jan. 3, 2017

(54) SPEAKER DEVICE

(76) Inventor: Mitsuo Nagaoka, Atsugi (JP)

( * ) Notice: Subject to any disclaimer, the term of this patent is extended or adjusted under 35 U.S.C. 154(b) by 416 days.

(21) Appl. No.: 14/001,500

(22) PCT Filed: Feb. 22, 2012

(86) PCT No.: PCT/JP2012/054297
§ 371 (c)(1),
(2), (4) Date: Aug. 19, 2014

(87) PCT Pub. No.: WO2012/115158
PCT Pub. Date: Aug. 30, 2012

(65) Prior Publication Data
US 2014/0348349 A1 Nov. 27, 2014

(30) Foreign Application Priority Data

Feb. 23, 2011 (JP) .................. 2011-036514
Feb. 23, 2011 (JP) .................. 2011-036515

(51) Int. Cl.
*H04R 11/00* (2006.01)
*H04R 9/06* (2006.01)
(Continued)

(52) U.S. Cl.
CPC . *H04R 1/02* (2013.01); *C09J 9/00* (2013.01); *H04R 1/288* (2013.01); *H04R 1/2896* (2013.01);
(Continued)

(58) Field of Classification Search
CPC .................. H04R 2307/201; H04R 3/002
(Continued)

(56) References Cited

U.S. PATENT DOCUMENTS 4,122,314 A * 10/1978 Matsuda .................. H04R 7/02
                                                        181/170
4,654,554 A *  3/1987 Kishi ....................... H04R 1/22
                                                        310/322

(Continued)

FOREIGN PATENT DOCUMENTS

JP          49-14431 U      2/1974
JP          60-043994 A     3/1985
(Continued)

*Primary Examiner* — George Monikang
(74) *Attorney, Agent, or Firm* — Loginov & Associates, PLLC; William A. Loginov

(57) ABSTRACT

The object of the present invention is that the surplus vibration involved therewith simultaneously generating a sound wave by the vibration of the vibrating cone of the loudspeaker unit is generated in the loudspeaker system, which has impaired the sound quality of the loudspeaker system. The purpose of the present invention is to provide a technique for improving the sound quality by reducing the this surplus vibration which are the loudspeaker frame vibration and the cabinet vibration like a front baffle vibration. The present invention is characterized in being configured with a viscoelastic material layer upon rear portions such as the frame surface of the loudspeaker unit and inside and outside surfaces of each surface configuring the loudspeaker cabinet, and additionally suppresses vibration by addition of a heavy member or pressurization caused by constraint of a binding member.

9 Claims, 26 Drawing Sheets

(51) Int. Cl.
*H04R 1/02* (2006.01)
*H04R 1/28* (2006.01)
*C09J 9/00* (2006.01)
*H04R 7/16* (2006.01)

(52) U.S. Cl.
CPC .......... *H04R 1/2819* (2013.01); *H04R 1/2842* (2013.01); *H04R 1/2857* (2013.01); *H04R 7/16* (2013.01); *H04R 2207/00* (2013.01); *H04R 2231/00* (2013.01)

(58) Field of Classification Search
USPC ........................................ 381/353, 354, 162
See application file for complete search history.

(56) References Cited

U.S. PATENT DOCUMENTS

| | | | |
|---|---|---|---|
| 6,343,128 B1 * | 1/2002 | Coffin | H04R 9/06 181/163 |
| 6,561,311 B2 * | 5/2003 | Chuang | H04R 1/02 181/148 |

FOREIGN PATENT DOCUMENTS

| | | |
|---|---|---|
| JP | 61-126690 U | 8/1986 |
| JP | 63-106292 U | 9/1988 |
| JP | 2004-048223 A | 2/2004 |
| JP | 2006-191336 A | 7/2006 |
| JP | 2007-060711 A | 3/2007 |
| WO | 2007069614 A1 | 6/2007 |

* cited by examiner

SPEAKER DEVICE

TECHNICAL FIELD

This application, which claims priority based on Japanese Patent Application JP 2011-36515 and Japanese Patent Application JP2011-36514 filed on Feb. 23, 2011 in Japan, the contents of which are incorporated herein by reference.

The present invention relates to a loudspeaker system.

BACKGROUND ART

Common loudspeaker equipment is shown in FIG. 22 in full-range loudspeaker unit use and an enclosure formal cabinet, furthermore FIG. 23 shows generating of sound and the vibrational state of a loudspeaker unit and the vibrational state of the cabinet by vibration of the vibrating cone of a loudspeaker unit, and the direction of an arrow of the figure is shown in the state in case the vibrating cone operates ahead by plus polarity, and FIG. 24 shows the schematic drawing the vibration propagation process. The loudspeaker system is established by the vibrating cone anteroposterior vibration of the loudspeaker unit by Fleming's left-hand rule between the magnetic field of the loudspeaker magnet and the magnetic field of the voice coil of the loudspeaker input signal, on the base of the stationary point of the non-vibration, and, thereby, a realistic reproduction sound of high resolution can be obtained. Especially for this high resolution, there is also a historical background needs of high-resolution sound that has been growing in an era of image is high resolution and has become a full high-definition video.

However, the loudspeaker unit of the loudspeaker system is a vibration generator, sound emission by the vibration of the loudspeaker vibrating cone is a purpose, and the loudspeaker frame and the all panels of the cabinet should be a stationary point of the non-vibrating, but the vibrating cone unit vibrates vibration accompanying occurs with adverse effect these vibrations are superimposed on the generated sound from the vibrating member of the loudspeaker unit direct sound emission from a cabinet is also made. With the sound generation of the air vibrations P1 forward due to vibration of the loudspeaker vibrating cone SPa, the vibration of the loudspeaker frame SPd through the loudspeaker damper SPb or loudspeaker edge SPc is generated specifically, the loudspeaker cabinet according to the frame vibration P3 of the front baffle 1a occurs. By complex of the air transmission of the rear air vibration P2 due to the vibrating cone vibration of the loudspeaker unit, and the solid propagation of the vibration of the front baffle, the surplus vibration P4 each side of the cabinet 1b•1c•1d occurs further. In addition to these, the resonance by the cabinet wall reflection is added, the vibration P5 flocks to vibrating cone backside of the loudspeaker unit again, then it makes the surplus vibration to the vibrating cone SPa, and the sound passes through the vibrating cone SPa. There is a vibration P6 of the reverse phase of the magnet side by the action and reaction of the vibration of the vibrating cone SPa of the loudspeaker unit in addition to this, this is work in momentum conflicting back and forth movement of the vibrating cone. The loudspeaker system serves as a sound generation, including also the variety surplus vibrations, and these caused the superimposition of distortion and sound masking fine sound to the air vibration P1 forward due to vibration of the vibrating cone SPa, therefore a fundamental and comprehensive solution for the removal of surplus vibration of all these is requiring.

For the cabinet and the loudspeaker unit is a two major elements of the loudspeaker system, proposal of material structure and many have been made so far, is an example of the loudspeaker cabinet to suppress the vibration by forming a reinforcing rib of the mountain-shaped cabinet rear panel vibration reduction of the cabinet (see for example, Patent Document 1), there is produced a composite baffle plate which inserted a viscoelastic sheet having airtightness large vibration damping effect a loudspeaker cabinet to suppress, such as rubber (see for example, Patent Document 2). The suppression of vibrations radiation consists of laminate obtained by laminating damping alloy (see for example, Patent Document 3), and resin plate box, and wood brittle material stone, concrete, ceramic, with silica fume mortar, plastic, and viscosity, such as iron, and further there is cabinet combined the toughness and material or elastic material, is constructed by interlacing particle board and filament winding (see for example, Patent Document 4). Further example, is an example of viscous material in the cabinet, a large number of forms a porous air chamber by an elastic structure inside the cabinet as the use of an elastic material, filled with viscous material, volume increasing effect and sound absorption some purposes even but elastic structure use, of the viscous structure is also conducted (see for example, Patent Document 5). As for the frame of the loudspeaker unit, the suppression of vibration have sought, providing a reinforcing rib reinforcing the frame has also been (see for example, Patent Document 6). However, in a schematic diagram of the process of propagation of the vibration shown in FIG. 24, for the deformation of each place and vibration propagation emanating from the loudspeaker unit that occur at the same time sound comes out at the start of the first vibration, the current situation is hardly addressed comprehensively and fundamentally.

The adverse effect of vibration P5 coming from the cabinet, the adverse effect of action and reaction vibration P6, and the adverse effect to the vibrating cone due to the elasticity resistance with an air capacity of cabinet, for these three adverse effects, the analysis is further described. The additional vibration P5 to the back surface of the vibrating cone of the loudspeaker unit by the vibration of the cabinet wall and reflected sound from the cabinet wall is a big factor, as a means for reducing this, of the shown in FIG. 25, in the prior art arrangement are placed back and forth for the two loudspeaker units SP1 and SP2, is driven with the same phase to form a common sound chamber 6, isolate the adverse effects of the cabinet is known. Thus, in addition to eliminating the vibration of the rear vibrating cone to isolate the effect of the cabinet in common sound chamber 6, for two loudspeakers to operate in the same phase, the rear loudspeaker unit forms the state that is easy to vibrate for front loudspeaker unit SP. By two vibrating cones to operate in the same phase polarity, the common sound chamber is the noise cancellation state, regarded the cabinet vibration as a noise, at the same time in this state, it is also possible to see the back assist states of the vibrating cone operation of the front loudspeaker unit by the rear loudspeaker unit. Thus, if two of three adverse effects are manufactured enough in consideration of rigidity and a vibration suppression, it will go towards solution, however, in this arrangement, it has not been solved about the vibration P6 by the side of the loudspeaker magnet by the action and reaction of vibration of the vibrating cone of a loudspeaker unit, and also since two loudspeaker units operate in the same direction for the same volume, the action and reaction vibration P6 increases. There is a back-to-back arrangement for the two loudspeaker units to offset the solution of the vibration caused by the action and reaction, and there is a arrangement to emit a sound outside for both loudspeakers (see for example, Patent Document 7), and there is a arrangement to emits a sound inside of a cabinet for one side loudspeaker (see for example, Patent Document 8). The action and reaction vibration P6 headed in the direction of resolution, the arrangement to make this back-to-back will bring forward the playback of sound fine if you manufacture in consideration to damping, however, for the additional vibration P5 to the back surface of the vibrating cone of the loudspeaker unit and the vibrating cone vibration caused by the elasticity of the air cabinet, the adverse effect reduction has not been made.

Therefore, for the purpose of solving both at the same time, there is suggestion to be shown in FIG. 26. In the back-to-back two loudspeaker units operated in the same phase polarity, so offsetting the vibration of the magnet according to action and reaction, it is guided by the sound path from the rear portion sound of the front loudspeaker unit SP1 to the vibrating cone front portion of the rear loudspeaker unit SP2, sound path although the diffraction, to form a common sound chamber 6 between SP2 and SP1, as well as before and after arrangement of the loudspeaker in FIG. 25, and it is what led to the cabinet from the vibrating cone rear portion sound of the rear loudspeaker unit SP2 further (see for example, Patent Document 9). By the loudspeaker placement of back-to-back, the offset reduction of action and reaction vibration P6, due to the formation of common sound chamber 6 and isolation of the additional vibration P5 by cabinet due to noise cancellation state of common sound chamber 6, back assist by the rear loudspeaker unit has been conducted, if production in consideration to the damping and stiffness, the improvement of reality by the reproduction of the sound clear and crisp sound reproduction of the fine is confirmed.

PRIOR ART DOCUMENTS

Patent Documents

Japanese Patent Publication JP2007-123963A
Japanese Utility model Publication JP61-126690U
Japanese Patent Publication JP2008-103935A
Japanese Utility model Publication JP05-11681U
Japanese Patent Publication JP2006-352647A
Japanese Patent Publication JP06-245295A
Japanese Utility model Publication JP06-77194U
Japanese Patent Publication JP10-178693A
Japanese Patent Publication JP2007-235727A

SUMMARY OF THE INVENTION

Problems to be Solved by the Invention

The object that this invention is going to solve about a speaker unit and the cabinet which are two major elements constituting a loudspeaker system, is reduction of the vibration of the loudspeaker unit which is the starting point of the vibration spread, furthermore, is reduction of the vibration of the cabinet. In the conventional technology, cabinet vibration and the loudspeaker unit vibration decrease, however there are disadvantageous, seeing from a standpoint of reduction to vibration of the total loudspeaker system, with the point that is the solution that is partial not comprehensive solution, with the point that the vibration restraint material and the structure itself are new vibration sources, with the point where difficulty of manufacture increases. The present invention is to solve these conventional problems, and by thinking that the sound of high quality by suppressing all of the vibration except the vibrating cone vibration of the loudspeaker, it is intended to achieve the high resolution sound, the present invention is established as a stationary point of the non-vibration of the cabinet and loudspeaker unit frame by vibration suppression, and provide a realistic sound reproduction of high resolution by the back-and-forth pure vibration of the loudspeaker unit.

To the spread of the sound of the waves of air vibration P1 of the front due to the vibration of the vibrating cone of the loudspeaker unit, to offset interference or waves of air vibration P2 of the rear due to the vibration of the vibrating cone is diffracted forward to the loudspeaker cabinet, a loudspeaker cabinet has a stiffness and capacity.

However, the air transmission for the rear air vibration P2 of the vibrating cone that comes in the same energy as the front of the vibrating cone sound, and the solid transmission for front baffle vibration P3 caused by the vibration of the loudspeaker unit itself, these complex causes the cabinet each side vibration P4, along with the obstacle to produce the sound of the cabinet, and by the air transmission again from the cabinet vibration there is a circulatory obstacle that the additional vibration P5 to the back side of the vibrating cone of the loudspeaker unit occurs. In addition to the first obstacle by the cabinet vibration, there is a generation of the reverse phase vibration P6 of the magnet, by the action and reaction of the vibrating cone vibration, this is the second obstacle. Further, the vibration of the back side of the vibrating cone of the loudspeaker unit, unlike the front side, by the limited volume the air elasticity resistance to the vibration can not be ignored, this is the third obstacle, and has led to a decrease in strain, poor crisp and resolution. As a simultaneous solution, there is a proposal that is shown in FIG. 26, in the arrangement of the back-to-back two loudspeaker units, operated by the same phase polarity for offsetting the vibration of the magnet according to action and reaction, and it is guided by the sound path from the rear portion sound of the front loudspeaker unit SP1 to the vibrating cone front portion of the rear loudspeaker unit SP2, to form a common sound chamber 6, and it is what led to the cabinet from the vibrating cone rear portion sound of the rear loudspeaker unit SP2 further.

Also on the first and the second obstacle to be resolved by the structure of the FIG. 26, with respect to the deformation of each place and vibration propagation such as a loudspeaker unit, at the same time that sound comes out, at the start of the first vibration of the loudspeaker unit, shown in FIG. 24, the treatment and vibration damping sufficient rigidity is important because it is multiple use of the loudspeaker unit. On the third obstacle about making noise cancellation state against air elasticity resistance the distance of the sound path of the two loudspeaker units through a common sound chamber 6 is shorter with high frequency to be back assist, it is an assist to the vibration of the vibrating cone of the front loudspeaker unit, since this is a strain relief to the front loudspeakers, the shortness of sound path is an important point of view. In FIG. 26, for example 12 cm achieved, air propagation speed of sound is approx. 340 m contrast, the path of the sound path is 34 cm wavelength at 1 kHz in combination loudspeaker diameter 60 mm, but up to ¼ wavelength given the in-phase frequency range, is about 800 Hz is the length of the 12 cm, up to this point is valid range of double drive by the two loudspeaker units in FIG. 26, the limited effect of the high frequency for this, and there is a problem in the formation of shorter sound path that is requiring the effect to sensitive areas to strain from 1

KHz-2 KHz at least in the high range. There is another subject using a plurality of loudspeaker units and an internal of the cabinet, the vibration energy for the cabinet so increases to the same audio output, so there is a problem that the more counterproductive increases vibration of the cabinet is increased, it is necessary to indicate the action to isolate the vibration treatment and to strengthen the damping force for the solution of this problem.

Solution to the Problems

And in order to solve the problems, a loudspeaker system of the present invention comprising (1), it is characterized in that a loudspeaker unit composed of a loudspeaker vibrating cone, a loudspeaker frame and a magnet; a viscoelastic material layer formed by viscoelasticity sealing material of denaturation silicone or polyurethane, or viscoelastic adhesive of denaturation epoxy, denaturation silicone epoxy, urethane or any mixture thereof, with the thickness of 1 mm or more in the region of more than 70% of the total area of the loudspeaker frame back side surface and the magnet back side surface.

Preferably (2), it is characterized in that an auxiliary member having rigidity is included in the viscoelastic material layer formed on the back side surface of the loudspeaker frame and the back side surface of the magnet.

Preferably (3), it is characterized in that the sand or coarse-grain object like sand, of 5 to 200 volume, of 0.3-5 mm average particle diameter based on 100 volume viscoelastic adhesive material is included in the viscoelastic material layer formed on the back surface of the loudspeaker frame and the back surface of the magnet.

Preferably (4), it is characterized in that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 2 mm or more with the entire annular larger 40 mm more than the loudspeaker unit mounting portion of the loudspeaker unit on the mounting baffle inside surface.

Preferably (5), it is characterized in that an auxiliary member having rigidity is included in the viscoelastic material layer formed on the baffle inside surface.

Preferably (6), it is characterized in that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 2 mm or more with the entire annular larger 40 mm more than the loudspeaker unit mounting portion of the loudspeaker unit on the mounting baffle outside surface.

Preferably (7), it is characterized in that an auxiliary member having rigidity is included in the viscoelastic material layer formed on the baffle outside surface.

Preferably (8), it is characterized in that the sand or coarse-grain object like sand, of 5 to 200 volume, of 0.3-5 mm average particle diameter based on 100 volume viscoelastic adhesive material is included in the viscoelastic material layer formed on the outside or inside surface of the loudspeaker unit mounting baffle.

Preferably (9), it is characterized in that for the cabinet with the loudspeaker unit, the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 1 mm or more in the region of more than 70% of the total area for at least one of the inner and outer surfaces of the cabinet wall.

Preferably (10), it is characterized in that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 3 mm or more in the region of more than 70% of the total area for both of the inner and outer surfaces of the cabinet wall.

Preferably (11), it is characterized in that the sand or coarse-grain object like sand, of 5 to 200 volume, of 0.3-5 mm average particle diameter based on 100 volume viscoelastic adhesive material is included in the viscoelastic material layer formed on the outer surface and inner surface of the cabinet wall.

Preferably (12), it is characterized in that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 3 mm or more for all each junction area of the cabinet walls.

Preferably (13), it is characterized in that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 0.5 mm or more by aggregation of the wall configuration material subdivided as cabinet wall.

Preferably (14), it is characterized in that the heavy weight is disposed.

Preferably (15), it is characterized in the binding member which gives pressurized from the outside of the viscoelastic material layer.

Preferably (16), it is characterized in that for the thermos as the main part of the cabinet space with the loudspeaker unit, the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 1 mm or more in the region of more than 70% of the entire area of the inner and outer surfaces of the thermos.

Preferably (17), it is characterized in that for the bellows duct used to bend as the main part of the cabinet space with the loudspeaker unit, the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 2 mm or more in the entire area of the outer surfaces of the bellows duct.

preferably (18), it is characterized in the plurality of loudspeaker units placed near back and forth in the same direction, to form a common sound chamber from back area of the outside sound emission loudspeaker area to back area of the internal loudspeaker, by reverse phase polarity driven, to connect from front area of the internal loudspeakers to the cabinet area, and to form the viscoelastic material layer with a thickness of 1 mm or more of the loudspeaker frame back side surface and the magnet back side surface for each.

Preferably (19), it is characterized in the plurality of loudspeaker units placed with near contiguity in the same direction, to form a common sound chamber from back area of the sound emission loudspeaker to back area of the internal loudspeaker, by reverse phase polarity driven, to connect from front area of the internal loudspeakers to the cabinet area, and to form the viscoelastic material layer with a thickness of 1 mm or more of the loudspeaker frame back side surface and the magnet back side surface for each.

Preferably (20), it is characterized in the plurality of loudspeaker units placed with near contiguity in the opposite direction, to form a common sound chamber from back area of the front side sound emission loudspeaker to back area of the internal loudspeaker, by same phase polarity driven, to connect from front area of the internal loudspeakers to the cabinet area, and to form the viscoelastic material layer with a thickness of 1 mm or more of the loudspeaker frame back side surface and the magnet back side surface for each.

Preferably (21), it is characterized in the plurality of loudspeaker units placed with near contiguity reverse arrangement in the same direction, to form a common sound chamber from front area of the back side sound emission loudspeaker to front area of the internal loudspeaker, by reverse phase polarity driven, to connect from front area of the internal loudspeakers, to the cabinet area, and to form the viscoelastic material layer with a thickness of 1 mm or more of the loudspeaker frame back side surface and the magnet back side surface for each.

Preferably (22), it is characterized in four or more loudspeaker units placed in back-to-back each speaker unit two pairs thereof, a common sound chamber of the four loudspeaker units back area, to form the front side sound emission loudspeakers one pair by positive phase polarity driven, to connect from front area of the internal loudspeakers one pair, to cabinet area by reverse phase polarity driven, and to form the viscoelastic material layer with a thickness of 1 mm or more of the loudspeaker frame back side surface and the magnet back side surface for each.

Effects of the Invention

In the invention (1), the formation of the viscoelastic material layer including also the internal loss of the viscoelastic material is large, and converted to thermal energy and vibration energy, there is no resonance itself, it becomes strengthening of stiffness and damping material layer formation relative to the loudspeaker unit frame, and for the strong vibration of the loudspeaker frame caused by the edge, the damper, the magnet simultaneously with the vibration of the vibrating cone of the loudspeaker unit, these suppress the vibration and hasten the decay of the vibration. In FIG. 24, the movement to the front of the vibrating cone of the loudspeaker unit and the movement to the back of the magnet occurs at the same time, it becomes that it pulls down the front and back of the loudspeaker unit frame, so the frame vibration but begins, but the damping is exhibited formation of the viscoelastic material layer is a layer formed of the non-restraint damping material layer, because of an originating point of vibration concave portion of the frame, here is a form close to the formation of the restraint damping material layer, damping is increased. The frame part of the loudspeaker unit is in contact with cabinet, moreover, it is a part that is in contact with the vibrating cone through the edge and damper, since the vibration here has had a strong impact on the turbidity of the sound, the reducing the vibration of here is the most fundamental, if you go the other measures do not sufficiently suppressed, it is to leave a distortion not be taken, therefore this is the most important part. Although want to the formation of the viscoelastic layer on the back side of the loudspeaker frame, it's so difficult to the formation the location of the loudspeaker units, so an application impossible region, but applied in the manufacturing process of the loudspeaker unit, doing so formed further promote effects. Further, the viscoelastic material because it has too stiff with increasing thickness of the layer, due to reducing the frame vibration of the loudspeaker unit, so the early decay and decline of the surplus vibration becomes realization of the sound with less distortion, then it becomes for the vibrating cone of the loudspeaker unit, a fine reproduction of the sound which has been masked by the frame vibration, it becomes the improvement of the resolution and it is improving the reality. The evaluation of sound quality is the most severe evaluated by listening sense, with comprehensive and depth localization and sound and tone, the comparison with real acoustic instruments, is evaluated to detect subtle differences.

In the invention (2), the vibrating cone vibration and the vibration of the magnet due to the reaction with the vibrating cone vibration are strong, about all surfaces of the rear surface of the loudspeaker units such as the frame back surface of the loudspeaker unit since a thickness of more than 10 mm due to the formation of the viscoelastic material layer, by having an auxiliary member having rigidity among the layers, between the auxiliary member and the frame of the speaker unit, it becomes damping layer in the form close to the restraint type from the non-restraint type up to it, as well as increase the effect of damping, the auxiliary member loudspeaker frame of the second, it also serves as a frame with reduced vibration, to get sound with less distortion due to a decrease in this frame vibration.

In the invention (3), by the presence of sand or coarse-grain object like sand, the damping described above is accomplished more effectively, therefore it is possible to further enhance the effect of the present invention.

In the invention (4), the formation of the viscoelastic material layer including also the internal loss of the viscoelastic material is large, and converted to thermal energy and vibration energy, there is no resonance itself, it becomes strengthening of stiffness and damping material layer formation relative to the vibration of the baffle of the loudspeaker mount periphery caused by the loudspeaker unit, and these suppress the vibration and hasten the decay of the vibration. Therefore the early decay and decline of the surplus vibration becomes realization of the sound with less distortion, then it becomes for the vibrating cone of the loudspeaker unit, a fine reproduction of the sound which has been masked, it becomes the improvement of the resolution and it is improving the reality.

In the invention (5), the loudspeaker unit vibration and the baffle vibration about of the loudspeaker unit mounting area around are strong, about the baffle inside surfaces to the baffle vibration of the loudspeaker unit mounting area, since a thickness of more than 10 mm due to the formation of the damping material layer, by having an auxiliary member having rigidity among the layers, between the auxiliary member and the frame of the speaker unit, it becomes damping layer in the form close to the restraint type from the non-restraint type up to it, as well as increase the effect of damping, the auxiliary member as the second baffle, it also serves as a frame with reduced vibration, to get sound with less distortion due to a decrease in this vibration.

In the invention (6), by the presence of sand or coarse-grain object like sand, the damping described above is accomplished more effectively, therefore it is possible to further enhance the effect of the present invention.

In the invention (7), the formation of the viscoelastic material layer including also the internal loss of the viscoelastic material is large, and converted to thermal energy and vibration energy, there is no resonance itself, it becomes strengthening of stiffness and damping material layer formation relative to both sides of the baffle to the baffle vibration of the loudspeaker mount periphery caused by the loudspeaker unit, and these suppress the vibration and hasten the decay of the vibration. Therefore the early decay and decline of the surplus vibration becomes realization of the sound with less distortion, then it becomes for the vibrating cone of the loudspeaker unit, a fine reproduction of the sound which has been masked, it becomes the improvement of the resolution and it is improving the reality.

In the invention (8), the loudspeaker unit vibration and the baffle vibration about of the loudspeaker unit mounting area around are strong, about the baffle inside surfaces to the baffle vibration of the loudspeaker unit mounting area, since a thickness of more than 10 mm due to the formation of the damping material layer, by having an auxiliary member having rigidity among the layers, between the auxiliary member and the frame of the speaker unit, it becomes damping layer in the form close to the restraint type from the non-restraint type up to it, as well as increase the effect of damping, it also serves as a frame with reduced vibration, to get sound with less distortion due to a decrease in this vibration.

In the invention (9), the formation of the viscoelastic material layer including also the internal loss of the viscoelastic material is large, and converted to thermal energy and vibration energy, there is no resonance itself, it becomes strengthening of stiffness and damping material layer formation relative to the cabinet constituent panels, in addition to the suppression of the vibration of the loudspeaker mount area and strong vibration loudspeaker frame, as well as to suppress the vibration of the wall all of the loudspeaker cabinet, and these suppress the vibration and hasten the decay of the vibration. Therefore the early decay and decline of the surplus vibration becomes realization of the sound with less distortion, then it becomes for the vibrating cone of the loudspeaker unit, a fine reproduction of the sound which has been masked, it becomes the improvement of the resolution and it is improving the reality.

In the invention (10), the formation of the viscoelastic material layer including also the internal loss of the viscoelastic material is large, and converted to thermal energy and vibration energy, there is no resonance itself, it becomes strengthening of stiffness and damping material layer formation relative to the cabinet panels inside surface and outside surface, in addition to the suppression of the vibration of the loudspeaker mount area and strong vibration loudspeaker frame, as well as to suppress the vibration of the wall all about the both side of the loudspeaker cabinet, and these suppress the vibration and hasten the decay of the vibration. Therefore the early decay and decline of the surplus vibration becomes realization of the sound with less distortion, then it becomes for the vibrating cone of the loudspeaker unit, a fine reproduction of the sound which has been masked, it becomes the improvement of the resolution and it is improving the reality. Therefore the surface of all possible for the loudspeaker unit and the cabinet of the two major elements of the loudspeaker system, becomes the non-restraint damping layer is formed, the surplus vibration is attenuated all.

In the invention (11), by the presence of sand or coarse-grain object like sand, the damping described above is accomplished more effectively, therefore it is possible to further enhance the effect of the present invention.

In the invention (12), the formation of the viscoelastic material layer including also the internal loss of the viscoelastic material is large, and converted to thermal energy and vibration energy, there is no resonance itself, to prevent the resonance propagates of each surface constituting the loudspeaker system, with the damping of the loudspeaker unit and the damping of the cabinet surfaces, the constituting to the early decay and decline of the surplus vibration becomes realization of the sound with less distortion, then it becomes for the vibrating cone of the loudspeaker unit, a fine reproduction of the sound which has been masked, it becomes the improvement of the resolution and it is improving the reality. The vibration of the cabinet are strong, therefore the thickness of the viscoelastic material layer of the wall so significantly increased to significantly reduce the vibration, to isolate each wall junctions in the viscoelastic material of the same, it is also intended to serve reduction in adverse effects to the speaker unit. The caveat that because of the viscoelastic material if the force is applied continuously the cabinet may be damaged by modifying gradually, for viscosity, and to prevent this, to increase significantly the cross-sectional area of the viscoelastic material near the junction is effective, for example, by the excitement of 10 mm or more in each of the inside and outside with the rigidity of more than enough, to prevent deformation.

In the invention (13), the formation of the viscoelastic material layer including also the internal loss of the viscoelastic material is large, and converted to thermal energy and vibration energy, there is no resonance itself, it becomes that this is to suppress the generation of a strong resonance surfaces that make up the loudspeaker system, to isolated on the viscoelastic material layer the subdivided constituent materials of each panels, to eliminate the strong resonance point by the multi-layer structure, becomes subdivided constituent material to constrained damping layer further, by damping of the loudspeaker unit, too, then contributes to early decay and reduction of surplus vibration becomes realization of the sound with less distortion, then it becomes for the vibrating cone of the loudspeaker unit, a fine reproduction of the sound which has been masked, it becomes the improvement of the resolution and it is improving the reality.

In the invention (14), after suppressing by a viscoelastic material layer for the resonance of the loudspeaker unit and the resonance of each surface constituting the loudspeaker system, and by placing the weight of the several times more than the loudspeaker weight, it is to be reduced the remaining vibration P6 of action and reaction. This arrangement of heavy weight reduces the adverse effects of the action and reaction vibration as close to a stationary point of the non-vibrating loudspeaker units, then it becomes for the vibrating cone of the loudspeaker unit, a fine reproduction of the sound which has been masked, it becomes the improvement of the resolution and it is improving the reality. For this heavy weight itself not it as the occurrence of a new resonance, the heavy weight arranging is covered with a viscoelastic material layer entirety on the viscoelastic material layer.

In the invention (15), by the viscoelastic material layer, to suppress the occurrence of the resonance of the loudspeaker unit the resonance of each surface constituting the loudspeaker system, further, against vibration remaining, giving pressurization from the outside of the cabinet by binding member, It is assumed that thereby suppress vibration effectively reduce the increase in mass, therefore It becomes realization of the sound with less distortion, then it becomes for the vibrating cone of the loudspeaker unit, a fine reproduction of the sound which has been masked, it becomes the improvement of the resolution and it is improving the reality. In this case, by reversing the order, when the formation of the viscoelastic material layer after the pressurization by binding member, the damping and vibration caused by the binding member also occurs, since uncontrollable in the viscoelastic material, there is a sequence of pressurization by the restraint member on the viscoelastic material layer, the effect is increased further to form a viscoelastic material layer thereon.

In the invention (16), the thermos has the sound blocking effect by the vacuum layer with the heat shielding, the decompression pressure effect, the strength and light weight, to take advantage of them, and damping by applying a viscoelastic material to the inside and outside further, internal loss is large for the occurrence of resonance of the metal, and it can be changed to heat energy vibration energy, with the no resonances viscoelastic material's own, there is no direct release sound by cabinet vibration, to realize the loudspeaker system with less distortion and small and light.

In the invention (17), with respect to the back side of the vibrating cone the rear open style loudspeaker system is taking advantage of the cabinet negative impact is small, and it is using a bellows duct and is intended to be reflected by bending the duct to secure the path length in order to extend down the bass reproduction range. In order to suppress the vibration of the duct, the formation of the viscoelastic material layer including also the internal loss of the viscoelastic material is large, and converted to thermal energy and vibration energy, there is no resonance itself, it is intended to form a elastic material layer over the all outer surface as non-constrained vibration damping layer, therefore, the relaxed sound with less back pressure to low range is realized.

If write down further overall effect, as can be seen a schematic diagram of the process of propagation of the vibration shown in FIG. 24, for the deformation of each place and vibration propagation that occurs at the same time sound comes out at the start of the first vibration, including the speaker unit, and the loudspeaker frame vibration is the starting point, by the damping all of the cabinet, surplus vibration caused by the vibration transmission A, B, and C in FIG. 24 is reduced, action is made to the comprehensive. For example, cymbal sound as high-frequency, bass sound as low-frequency, piano sound, string instrument sound and vocal sound as a total sound quality, about them for the reproducibility of the sound, the resolution and the sound image positioning, there is an effect of reality significant improvement with respect to the results of each effect confirmation. The results show the effect of the reducing unnecessary vibration and the vibration cancellation for all volume range, and for the audibility, any volume, any range it becomes clear sound, crisp better, improved percussion presence, the sensed sound the sound that was hard to hear and the realization of high-resolution sound to the desired progress.

In addition, it is written about the effects of individual invention. In the invention (18), the short path common sound chamber is realized, and the isolation and the mitigation of the adverse effects of the cabinet vibration from the loudspeaker unit backside are made, the mitigation of adverse effects of action and reaction is also made, and it is back to assist the front loudspeaker unit by the rear loudspeaker unit to a higher frequency range, and to improve the quality of the emitted sound is made. From the back of the vibrating cone in front loudspeaker unit to the back of the rear loudspeaker unit, the common sound short distance path is formed, and the front of the rear loudspeaker unit is connected to the cabinet further, moreover, the two loudspeaker units is the reverse phase connected in parallel or in series, and the arrangement of the front and back, so the vibration direction of the two loudspeaker units are the reverse direction each other, therefore the vibration of action and reaction is also offset.

In this case, that two loudspeakers have the same direction placement with the opposite direction, in particular the edge movement back and forth of the loudspeaker unit is not necessarily symmetry, it works to correct this as well be made. The adverse effects from the rear side of the back of the loudspeaker unit of sound emission external, is reduced in terms of three, reduction of vibration action and reaction, and cabinet isolated, and back assist, therefore, it is confirmed by the good tone and good attack of the piano sound of audibility.

In the invention (19), the short path common sound chamber is realized, and the isolation and the mitigation of the adverse effects of the cabinet vibration from the loudspeaker unit backside are made, the mitigation of adverse effects of action and reaction is also made, and it is back to assist the front loudspeaker unit by the rear loudspeaker unit to a higher frequency range, and to improve the quality of the emitted sound is made. This arrangement, simply put two loudspeaker units in a small box, leading to sound emission outside the cabinet and the other one, is realized strongly structurally the formation of the short path common sound chamber and the offset of action and reaction, by a simple structure. However, for offset of action and reaction vibration, the rotating moment is generated in order to not on a straight line, it can be improved by arranging heavy weight.

In the invention (20), the short path common sound chamber is realized, and the isolation and the mitigation of the adverse effects of the cabinet vibration from the loudspeaker unit backside are made, the mitigation of adverse effects of action and reaction is also made, and it is back to assist the front loudspeaker unit by the rear loudspeaker unit to a higher frequency range, and to improve the quality of the emitted sound is made. The arrangement arranged a small box in front of the conventional loudspeaker system, emits a sound by the opposite direction in another loudspeaker unit, then the loudspeaker units are with same phase, but by the arrangement is the reverse direction, the action and reaction offset is made, common sound path is short, too. For offset of action and reaction vibration, the rotating moment is generated in order to not in a straight line, it can be improved by arranging heavy weight.

In the invention (21), the short path common sound chamber is realized, and the isolation and the mitigation of the adverse effects of the cabinet vibration from the loudspeaker unit backside are made, the mitigation of adverse effects of action and reaction is also made, and it is back to assist the front loudspeaker unit by the rear loudspeaker unit to a higher frequency range, and to improve the quality of the emitted sound is made. This arrangement of the two loudspeaker units, leading to sound emission outside the cabinet and the other one, is realized strongly structurally the formation of the short path common sound chamber and the offset of action and reaction, by a simple structure. However, for offset of action and reaction vibration, the rotating moment is generated in order to not in a straight line, it can be improved by arranging heavy weight. In addition, it is sound emission outside by the loudspeaker unit backside in opposite side arrangement, therefore, the damping due to viscoelastic material of the loudspeaker frame is requiring enough.

In the invention (22), the mitigation of the adverse effects of the cabinet vibration from the loudspeaker unit backside is made, and the back assist is also better to assist the front loudspeaker unit by the rear loudspeaker unit, the mitigation of adverse effects of action and reaction is also made, and to improve the quality of the emitted sound is made. Here, In order to ensure for the offset of action and reaction vibration, the load conditions of the same air in a back-to-back symmetry is required, therefore the arrangement is to form a common sound chamber by the loudspeaker units of two pairs of back-to-back, is the front each of one pair for the sound emission, and is the front each of another pair to the cabinet. Thus, for the arrangement, also the load on the air, the symmetry loudspeaker system is realized.

The common matters are the formation of the common sound chamber by the multiple loudspeaker units at close distance, the arrangement of the offset of action and reaction vibration, and the damping due to viscoelastic material, these are the back assist to the vibration of the vibrating cone to a higher frequency, the isolation to the cabinet, and the vibration reduction of the action and reaction, thereby it is made to the improvement of emission sound. Thus, the first obstacle of the cabinet vibration adverse effects, the second obstacle of the generation of vibration P6 reverse phase of the magnet side by the action and reaction of the vibrating cone vibration, and the third obstacle due to the air elastic resistance that can not be ignored even to the back side vibration of the vibrating cone of the loudspeaker unit, are resolved, so everything is resolved with range of up to treble, and the deformation and the vibration transmission A, B, and C in FIG. 24 are also solved by damping. The reduction of the impact of the cabinet resonance by these, the reduction of the impact of action and reaction, the rigidity stronger structure of the loudspeaker unit around, and to prevent the resonation by the viscoelastic material, so from a position to listen, it becomes clear sound in any range in any volume, and crisp effect becomes very well is provided. About the effects, the presence of a percussion instrument becomes good, the sound of the detail sign and the sound did not hear comes to hear, comfortable sound will be realized, and the realization of the sound of high resolution made into the purpose progresses.

In the preferred embodiment, there are the increased costs due to loudspeaker units use more than one, and the decrease in efficiency about added loudspeaker unit that is ringing inside, but in the multiple use of the general loudspeaker unit, the clear and realistic sound can be obtained in the biggest feature, therefore the goodness of the sound quality is so much, as impossible to know where sounding, so the satisfaction in sound quality is large regardless of the large or small volume. About the general home use and a normal environment, the turbidity distortion loud sound is hated, and the clear sound even in the small sound obtained a favorable impression. About the complication of the structure, in mass production the loudspeaker unit part is manufactured by a plastic and the vibration suppression of the viscoelastic material layer is formed, therefore it does not become a complicated process.

DETAILED DESCRIPTION OF THE ILLUSTRATIVE EMBODIMENT OF THE INVENTION

Figure 1:
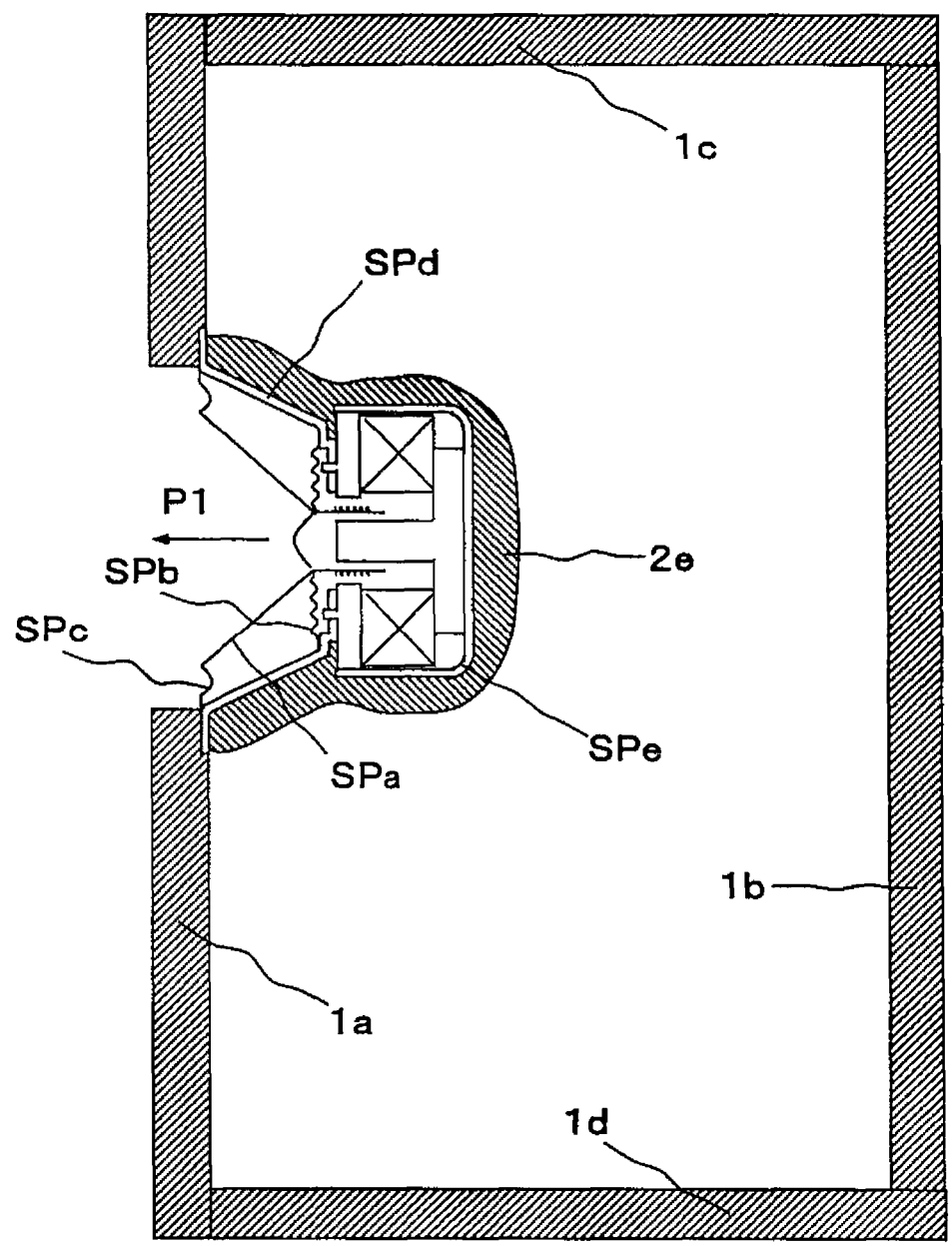
FIG. 1 is a drawing showing a loudspeaker system structure according to the embodiment 1 of the present invention, thereof it except for the part required for installation and moving parts such as edge, damper and cone of the loudspeaker unit, the viscoelastic material layer is formed to all the surface possible to apply additionally the viscoelastic material, such as frame surface of the loudspeaker unit backside.

Hereinafter, embodiments of the present invention will be described in detail. At the beginning, the basic verification and effectiveness comparison of the viscoelastic material is made. As a resonance body of the subject, and to prepare the four glass cup of 111 mm height diameter 61 mm, the viscoelastic material is one type from the adhesive, in addition to the two types of construction sealant with high vibration suppression effect, and forming a viscoelastic material layer of 3 mm to let coated dried, so the measurement of sound at impact is performed. In particular, A: glass cup, B: U928C-X bond of one-component urethane adhesive, C: Cemedine SM-202 of the denaturation silicone sealant, D: Cemedine POS seal SM-444 of the denaturation silicone sealant as well. In step-by-step application, finding the resonance suppressing effect of viscoelastic material layer formed on the entire outside and inside is high is obtained, the result of the measurement of the intensity of the sound generated by the measuring in the outside and inside across the coating, shows A decrease of 3 db in B, showed a decrease in 5 db in C and D. The decay time of the sound does not change in B, 13% decrease in C, and 28% decrease in D. The pitch was reduced A 932 Hz is decreased in B 831 Hz, in C and D 784 Hz with the mass increase. Thus there is the vibration damping effect due to the formation of the viscoelastic material layer, there is a finding that high vibration damping effect of POS seal especially.

Further, as a confirmation of this POS seal, by applying the string of stringed instrument, it is found of the effect to the range up to the harmonic frequency from 600 Hz to 100 Hz. The instruments used in classical guitar with a nylon string containing the winding wire. After drying the coating to POS seal application, treble E string of line 1 the sound strength decrease 6 db, the decay time reduction 84%. B string of line 2 the sound strength decrease 6 db, the decay time reduction 66%. G string of line 3 the sound strength decrease 15 db, the decay time reduction 78%. D string of line 4 the sound strength decrease 9 db, the decay time reduction 95%, A string of line 5 the sound strength decrease 12 db, the decay time reduction 91%, Bass E string of line 6 the sound strength decrease 15 db, the decay time reduction 91%, the shortening of the decay time is greater at any range, the loudness be made particularly small in the low frequency range, so that so it only sounds small like pizzicato playing.

Through the prior confirmation of these, to form a viscoelastic material layer to the loudspeaker system, by pink noise that includes a well-balanced whole range, the confirmation of vibration attenuation is performed. The small loudspeaker system is caliber 65 mm, the thickness of the cabinet 9 mm, 198 height, 125 width, 174 mm in depth and 6 liters volume. In the sense of hearing is the application of POS seal to the loudspeaker backside of the unit and to the front baffle surface large vibration, even coating thickness of 0.5 mm, hazy sense of sound is reduced, the high-frequency sound that have previously been masking is reproduced clearly, so that the change is confirmed. With respect to vibration measurements, in application of 0.5 mm thickness of the outer surface all, the vibration reduction of 3 db was seen as a whole. Further, the application the backside and to the speaker frame, increase to the front and back, when the entire surface becomes the thickness of the layer of 4 mm or more, the vibration reduction of 8 db is confirmed. The changes in sound that hit the cabinet surface, at the side central portion the sound intensity 12 db reduction and 60% reduction in decay time, at the top center the sound intensity 9 db reduction and 51% reduction in decay time, the effect of early decay and vibration suppression by viscoelastic material application is confirmed. From the results of these, the layer thickness has led to the view to exert a sufficient effect in 0.5 mm or more. For application area, the cabinet entire area is preferred, but the required range if squeezed, the hexahedral structure of the cabinet shape normal, top and bottom panel of the rectangular solid is a narrow and a stronger stiffness, as essential aspects of all but the upper and lower surfaces, it is regarded as a rectangular cube, the application area is required a region more than 66%.

In the present invention, the viscoelastic material layer which is formed at a predetermined position, sand or coarse-grain object like sand is preferably included. The amount of the sand or coarse-grain object like sand is, with respect to 100 volume of viscoelastic adhesive material, 5 to 200 volume, preferably from 5 to 100 volume, more preferably from 5 to 50 volume. The average particle diameter of the sand or coarse-grain object like sand is 0.3-5 mm, preferably 0.3-2 mm, more preferably 0.3-1 mm. By the presence of sand-like granules or coarse sand, the damping described above is realized at a higher level, it is possible to further enhance the effects of the present invention.

Following this, in addition to the loudspeaker system is measured to form the viscoelastic material layer, the loudspeaker various systems and the various technology systems large and small from the PC use type to floor type, are performed the formation of the layer by applying a viscoelastic material after the alcohol degreased surfaces of the cabinet for 40 sets or more, it was confirmed the same effect by listening. The POS denaturation silicone seal does not sag, therefore the workability is good because it can be applied to vertical surfaces. However, it is necessary to process 24 hours to dry, but it is viscoelastic material is seen as a necessary time. It takes a time of about 5 days to complete fixation, but the time is considered acceptable from production to actual use start, by the normal scope. There is no problem with the stability partly because they are the building materials durability and life. For application area, the backside entire area of the loudspeaker unit is preferred, but the required range if squeezed, as essential aspects of the frame and the concave point of the frame in the frame and the concave point of the frame and magnet cover formed backside, the application area is required a region more than 60% of the loudspeaker unit backside throughout.

Figure 17:
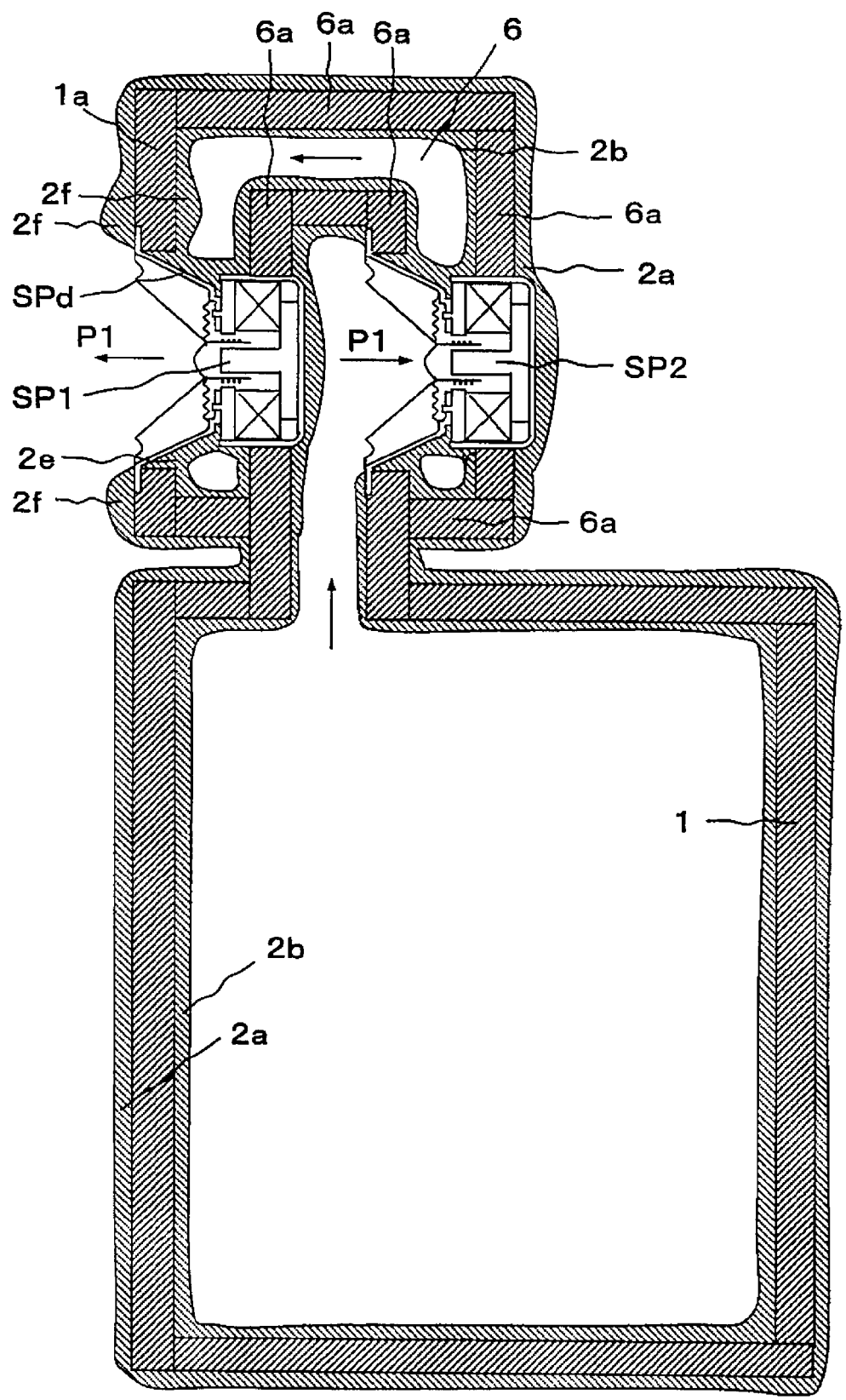
FIG. 17 is a drawing showing a loudspeaker system structure according to the embodiment 14 of the present invention, thereof the formation of the common sound chamber 6 by two loudspeaker units, with the same direction front and back close to each other, and the formation of the viscoelastic material layer are shown.
Figure 23:
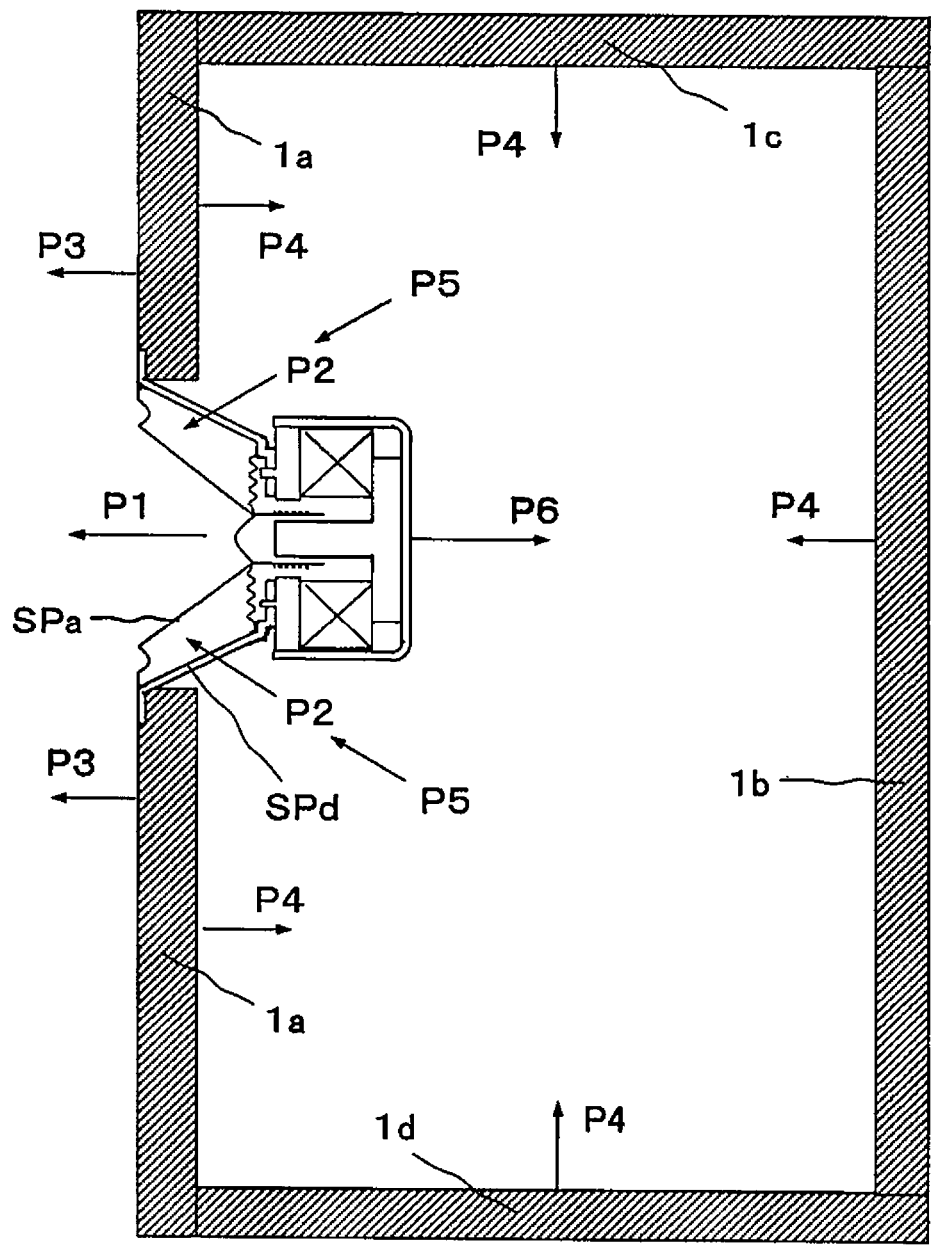
FIG. 23 is a drawing showing the generation of sound and the vibrational state are appended on FIG. 22.
Figure 24:
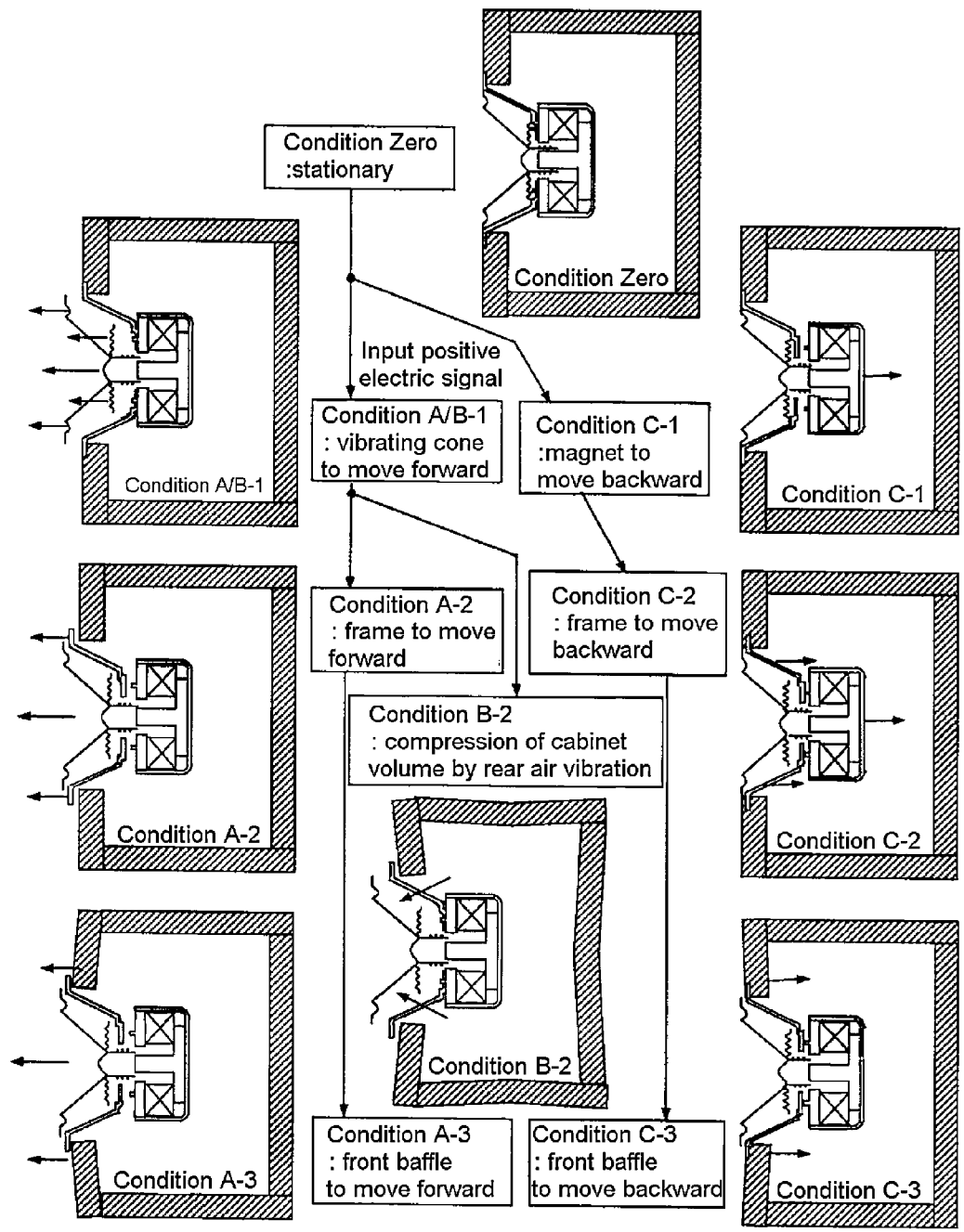
FIG. 24 is a drawing showing the process of the vibration propagation at the voltage applied to the positive polarity of the loudspeaker unit is appended on FIG. 22.
Figure 25:
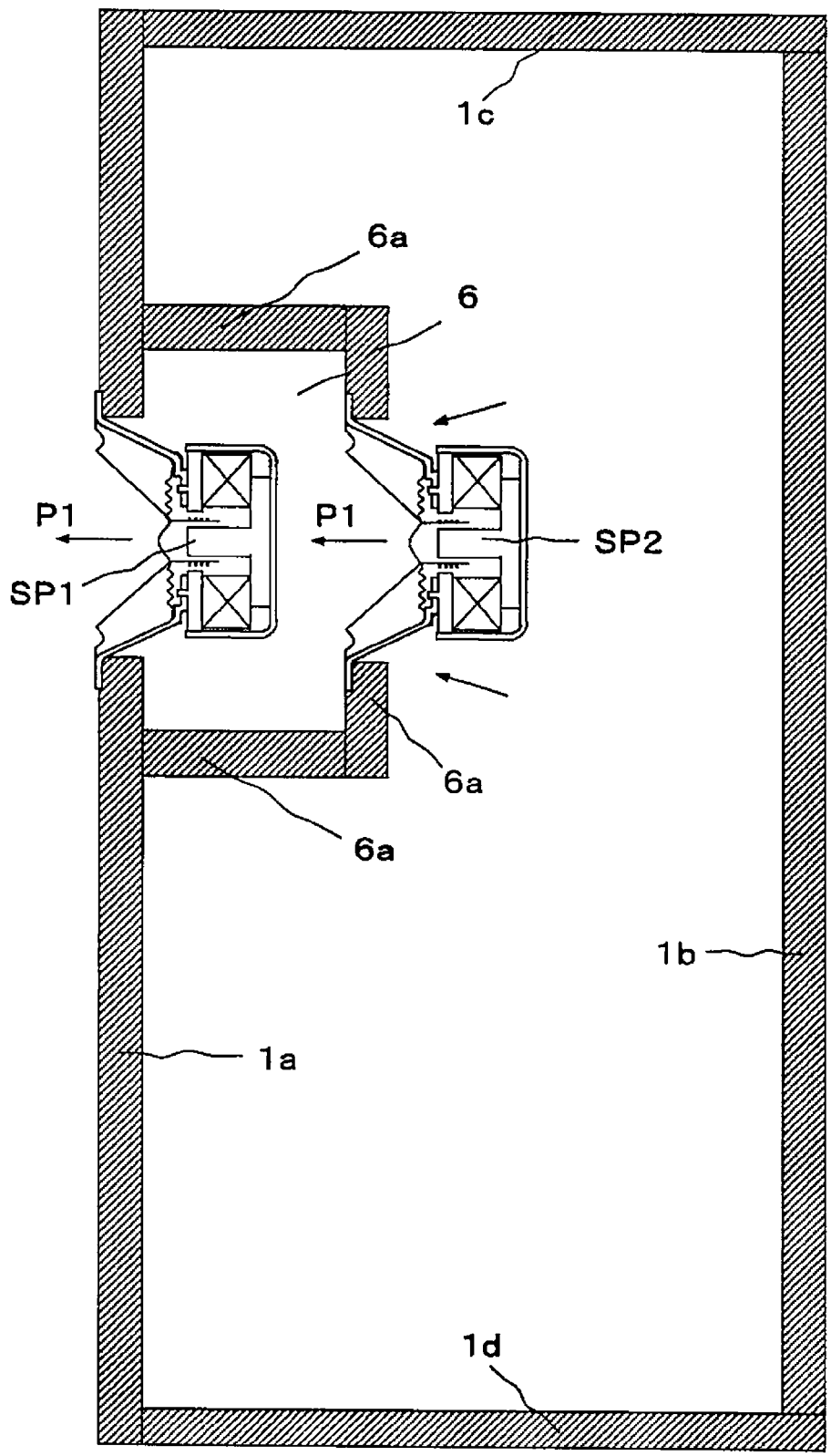
FIG. 25 is a drawing showing a loudspeaker system structure, thereof the formation of the common sound chamber 6 by arranging front and rear the same direction of two loudspeaker units in the same phase drive, as a conventional example, is shown.

Hereinafter, embodiments of the present invention will be described in detail. The present invention is intended to achieve both high frequencies to a reduction in adverse effects, the adverse effects are in FIG. 23, the adverse effect of vibration from the cabinet of P5, the adverse effect of action and reaction vibration P6, and the adverse effects on the vibrating cone vibration caused by the elastic air by cabinet capacity. For this purpose, as shown in FIG. 17, the arrangement of front and rear with the same direction of the two loudspeaker units, between loudspeaker unit SP1 and SP2 in FIG. 24 to a tight close, operated by the reverse phase polarity of the two loudspeaker units, so the canceling the action and reaction vibration of each other, and it is guided by the sound path from generated sound of the vibrating cone rear portion of the front speaker unit, to the sound vibrating cone rear portion of the rear loudspeaker unit to form a common sound chamber 6, and it is what led to the cabinet from the vibrating cone rear portion sound of the rear loudspeaker unit SP2 further. By this FIG. 17, the 80 mm sound path is reduced 30%, the back assist effect is up to about 1.2 kHz 50% up. If a common sound chamber is large and long, the back assist effect reduce, at the same time, since the resonance there happen as the second cabinet, that closer is better understood.

Figure 26:
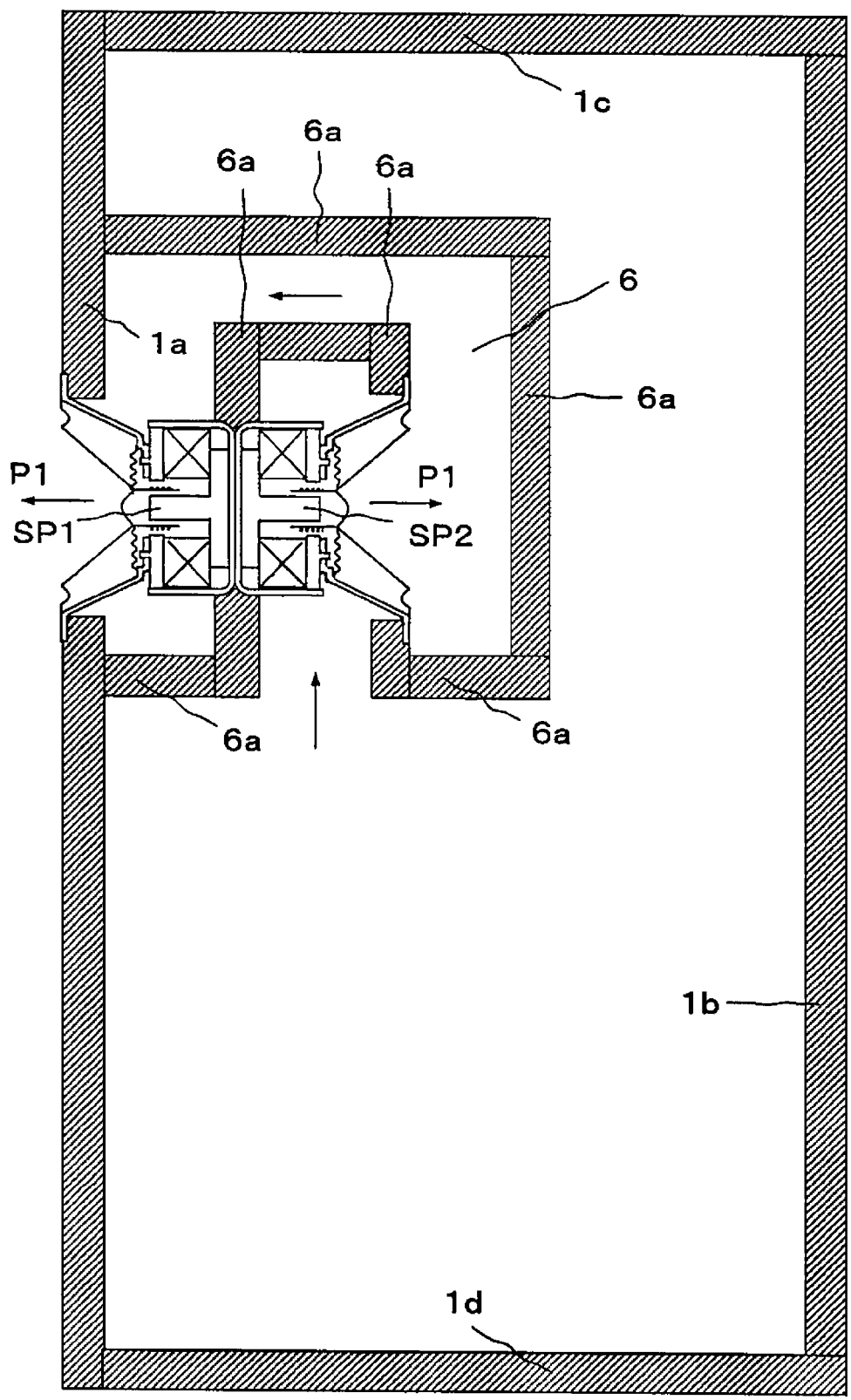
FIG. 26 is a drawing showing a loudspeaker system structure, thereof the formation of the common sound chamber 6 by arranging back to back the reverse direction of two loudspeaker units in the same phase drive, as a conventional example, is shown.

In the implementation, it is also necessary the reduction of vibration P4 of the cabinet unit and the isolation of vibration of the cabinet wall transmission, with this in mind, in order to reduce the wall resonance, there is a need to do that to form viscoelastic material layer 2a, 2b, 2e, 2f in the inner and outer surfaces, and by the eliminating a common wall to the cabinet wall common, the loudspeaker unit and sound chamber 6, the cabinet wall to separate the cabinet wall is good. Further, the transmission of the sound wave in the common sound chamber 6, in FIG. 26 by the folded back 180 degrees reaches the internal loudspeaker unit, on the other hand, in FIG. 17 by the diffraction of 90 degrees it reaches the vibrating cone of the internal loudspeaker unit, so the sound of the loudspeaker units of the front and back easy to push-pull each other, it is also advantageous in terms of formation of the common sound and chamber sound path, with the low sound reflections. Further, the loudspeaker units front and rear operates on the reverse polarity, and the movement of the vibrating cone edge is reversed each other, therefore the asymmetric distortion during expansion and contraction of the edge is also improved, to sound emission forward the sound quality will be better.

As an application of FIG. 17, for the sound to reach at the same time as more evenly between the loudspeaker units front and rear, rather than the top of the speaker unit around a common sound chamber, be formed two on the left and right is also a good way, and for the route to a cabinet rather than two further downward, when placed in the back by two up and down, if to modularize this two speaker unit, it is also possible to install to the speaker holes in the existing cabinet. For the arrangement other than this, describing sequentially including the FIG. 2, in comparison with the loudspeaker system general and FIG. 17 in the same source, for example, for cymbal sound as high-frequency, bass sound as low-frequency, piano sound, string instrument sound and vocal sound as a total sound quality, about them for the reproducibility of the sound, the resolution and the sound image positioning, especially grand piano sound with the reproducibility of the sound quality of difficult, the delicacy of the treble and the resolution in the attack of the multiple sound are increased, the dynamic range is spread, the distortion in range of several hundred hertz is reduced further, clear sound realistic is realized, in the common room with sound speaker unit, and by the damping due to the formation of the viscoelastic layer is advanced, finally it is reaching to the sound quality as the sound of the different dimension shiny. Moreover, the application range of the present invention broadly, from ultra-small to large type, from high-end to low-cost band, the sound quality be improved in each zone.

Embodiment 1

FIG. 1 is a representation of the cross-sectional structure of a loudspeaker system according to the embodiment 1 of the present invention. The embodiment 1 is a loudspeaker system characterized in the viscoelastic material layer formed by viscoelasticity sealing material of denaturation silicone or polyurethane, or viscoelastic adhesive of denaturation epoxy, denaturation silicone epoxy, urethane or any mixture thereof, with the thickness of 1 mm or more in the region of more than 70% of the total area of the loudspeaker frame back side surface and the magnet back side surface except for the part required for installation and moving parts such as edge, damper and vibrating cone of the loudspeaker unit. That the internal loss of the viscoelastic material is large, there is no resonance of itself becomes a realization of the sound with less distortion, it becomes for the vibrating cone of the loudspeaker unit, a fine reproduction of the sound which has been masked, it becomes the improvement of the resolution and it is improving the reality. The FIG. represents a cross-sectional structure, the width at a view from the front of the left side of FIG. is slightly larger than the speaker width or is several times, and the loudspeaker frame part in the figure although looks backward emission of the sound to not allow to form a viscoelastic material layer therein, there are the plurality of large holes in the speaker frame, no problem occurs also with respect to the rear sound emission of from the vibrating cone after the formation of the viscoelastic material layer to the frame.

Among the viscoelastic material having the property that includes both the viscosity and elasticity, viscoelastic sealant of denaturation silicone or polyurethane, or viscoelastic adhesive of epoxy-modified, denaturation silicone epoxy, urethane are high internal loss, so it is the best form damping layer to the cabinet and speaker frame, and this is effective for enhanced rigidity and vibration suppression of the cabinet and the loudspeaker frame, then that large internal loss more, lead to the absence of secondary disorders such as resonance of sound in itself. There is an optimal point on Young's modulus 5 MPa near, the rubber hardness of 30 degrees near, in coats of the different materials to hardness decrease sequentially so that the layer formation of lopsidedness, it is more effective. For example, butyl rubber, pitch, asphalt, rubber and metal materials are very high viscosity, high elasticity or high rigidity, respectively with include the complex materials and handling, workability, placement for indoor use and durability the total balance is bad comprehensively. The viscoelastic material, as representative of the POS seal of denaturation silicone sealant especially, affinity with the coated surface is good, there is no liquidity, expansion and drying shrinkage is small, durability is good, and more than anything the resonance after solidified even thicker by recoating less, moreover, the rigidity also increases. Therefore it is a good material as vibration suppression of the loudspeaker system. The reason for damping the aim of the entire area of the loudspeaker unit backside, the occurring vibration is over the entire unit, on the effect is limited even if the damping certain area, there is no significant change in the vibrational energy, the resonance point also varies, so to form a viscoelastic layer around the whole circumference comprehensive, an increase in internal loss, enhancements to the stress of expansion, compression, torsion slip by improving rigidity is achieved, therefore the vibration is suppressed. When coating, ensuring the adhesion surface strength of the loudspeaker unit is important, making a primer treatment or alcohol degreasing is required.

Since the vibration of the frame SPd of the loudspeaker unit SP is suppressed by the viscoelastic material layer, the front release sound by vibration P1 by vibrating cone is made clearer without frame vibration overlap, it has been identified for treble first, crisp and better low frequency with an increase in the thickness of the viscoelastic material layer, finally midrange come pure. The vibration of the loudspeaker frame is caused by the damper vibration of the vibrating cone vibration and the vibration of the vibrating cone edge, and the propagation of vibration of the vibrating cone and the vibration of the magnet due to action and reaction of the vibrating cone are overlapped, so it is necessary as the basis to be performed sufficiently damping this. If this is insufficient, with the progress of measures to other, the distortion of the loudspeaker unit resonance remains, so the resolution of the entire delays.

The application of the viscoelastic to the rear portion such as the loudspeaker frame is either sufficient, for example, the loudspeaker unit is mounted to the opposite front and rear, to be heard the sound of the loudspeaker rear inaudible usually, the thickness of the viscoelastic layer is increased, how to increase the thickness until clear sound in all range is good, it is also a state where more than 12 mm, viscoelastic material frame also can be said. Further, beyond the width of the loudspeaker frame, viscoelastic material layer may be overhanging, if a few number of feet of the loudspeaker frame and the large opening of the loudspeaker frame, it is also possible to add the foot of the frame directly by the viscoelastic material.

The loudspeaker frame normal is iron material, but the effect of vibration improvement by viscoelastic material layer is large of plastic material, even if the die-cast aluminum for high-class is in material the effects due to the formation of the viscoelastic material layer is large. For the forming a viscoelastic material layer is formed the backside of the loudspeaker throughout and the baffle around the speaker mounting, it has been described as an example a single-cone speaker of the single vibrating cone, a squawker and tweeter of multi-way such as 2-way, 3-way, because it is a state of resonance of midrange similar can be also applied to damping due to the formation of the viscoelastic material layer, furthermore the loudspeakers of the loudspeaker than the direct radiation type called direct radiator type of single cone are here, that further the formation of the viscoelastic material layer can be applied to outer rear surface of to the horn and driver in horn speakers and to rear side of the dome speaker. Further, as for speaker structure not only sealed type, bass reflex type of phase inversion, open back enclosure type, back load horn type, the damping due to the formation of the viscoelastic material layer of the present invention, for the loudspeaker unit vibration and the cabinet vibration like the entire surface baffle vibration especially, is effected as well as the closed box type.

Embodiment 2

Figure 2:
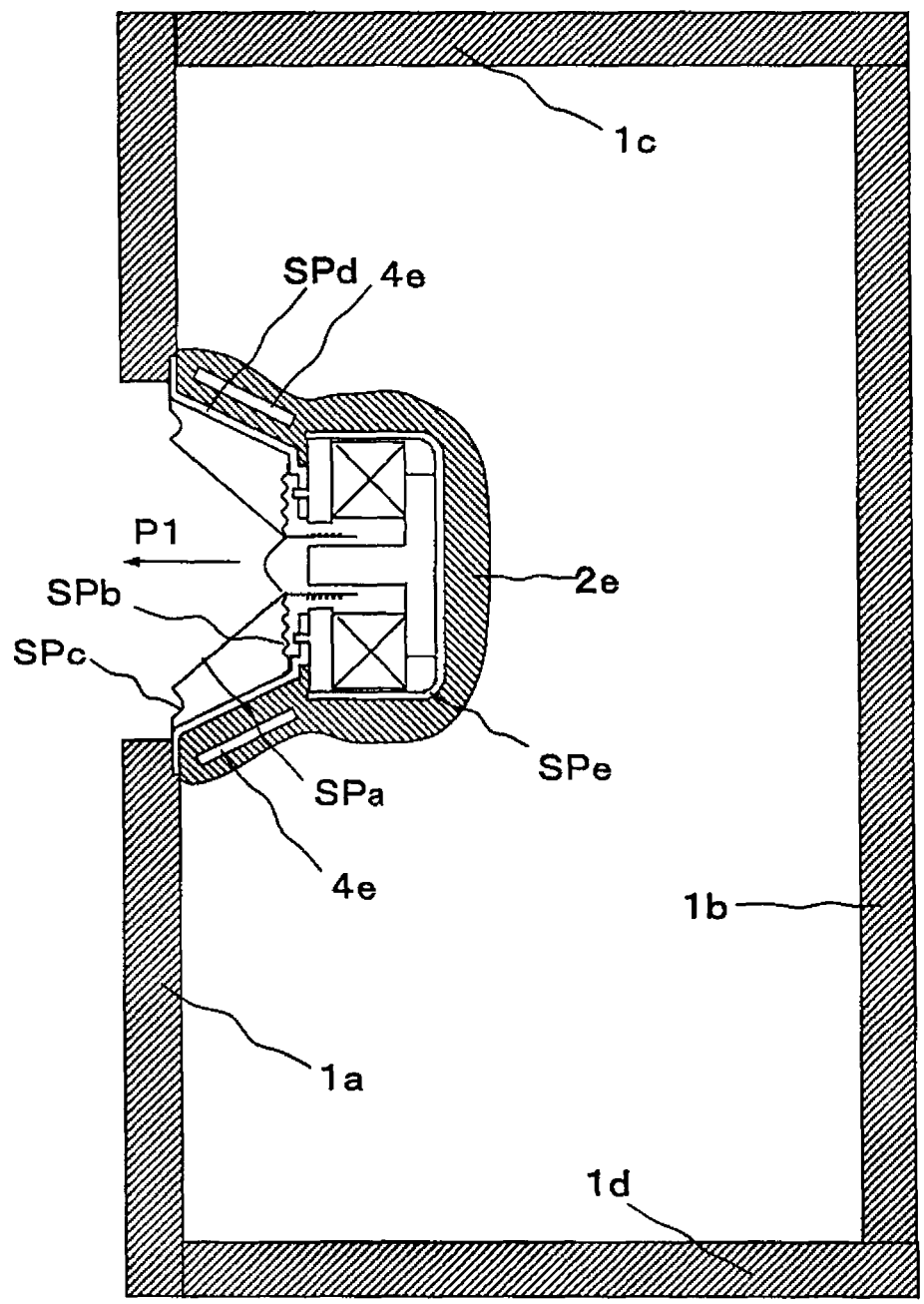
FIG. 2 is a drawing showing a loudspeaker system structure according to the embodiment 2 of the present invention, thereof it is the loudspeaker system of FIG. 1 with an auxiliary member having rigidity in the viscoelastic material layer of the loudspeaker frame.

FIG. 2 is a representation of the cross-sectional structure of a loudspeaker system according to the embodiment 2 of the present invention. The embodiment 2, it is a loudspeaker system of FIG. 1 having an auxiliary member having rigidity within the viscoelastic material layer of the loudspeaker frame, the vibration of the magnet due to the reaction with the vibrating cone vibration is strong, therefore the damping due to the formation of the viscoelastic material layer to the surface of all of the backside of the speaker units such as the frame surface of the speaker unit backside because a thickness exceeding 10 mm, having an auxiliary member having a rigidity among the layers becomes as close to the restraint vibration suppression, it increases the effect of damping, to obtain a sound with little distortion. Auxiliary member with this rigidity is the iron plate or 3 mm thickness, 10 mm width, 30 mm length, or metal such as bolts about the same length, wood material or plastic material, and the rigidity enhances the effect of damping and the viscoelastic material is damping the characteristic vibration of the auxiliary member.

Embodiment 3

Figure 3:
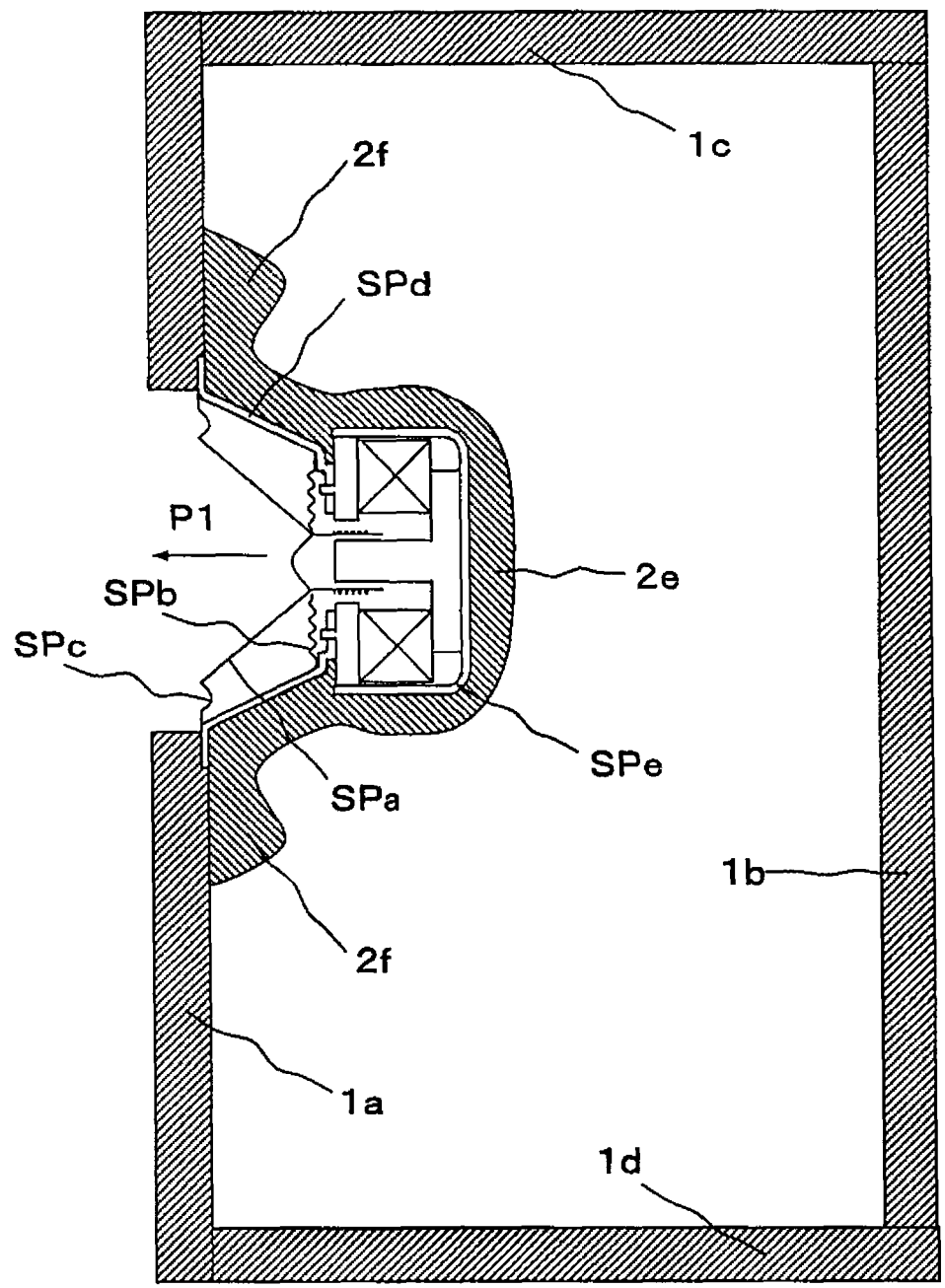
FIG. 3 is a drawing showing a loudspeaker system structure according to the embodiment 3 of the present invention, thereof it is the loudspeaker system of FIG. 1 over the entire region of the annular formed of the loudspeaker unit mounting baffle backside, that is larger than 40 mm or the loudspeaker unit mounting portion, it forms a viscoelastic material layer.

FIG. 3 is a representation of the cross-sectional structure of a loudspeaker system according to the embodiment 3 of the present invention. The embodiment 3 is the loudspeaker system of FIG. 1 with that the viscoelastic material layer 2f made of the viscoelasticity sealing material of denaturation silicone or polyurethane, or viscoelastic adhesive of denaturation epoxy, denaturation silicone epoxy, urethane or any mixture thereof, is formed with a thickness of 2 mm or more with the entire annular larger 40 mm more than the loudspeaker unit mounting portion of the loudspeaker unit on the mounting baffle inside surface. This is to form the annular viscoelastic material layer 2f to vicinity of the loudspeaker unit mounting portion the inside surface of the cabinet of FIG. 3, and this is due to the internal loss of the viscoelastic material, in addition to the suppression of vibration of the loudspeaker unit, the vibration of the peripheral baffle mounting portion of the loudspeaker unit is suppressed, it becomes the realization of sound with less distortion, then it becomes for the vibrating cone of the loudspeaker unit, a fine reproduction of the sound which has been masked, it becomes the improvement of the resolution and it is improving the reality. For the loudspeaker unit mount area around it, the vibration by the loudspeaker unit is large, so the suppressing of this vibration is important next to suppressing the vibrations of the speaker unit.

Embodiment 4

Figure 4:
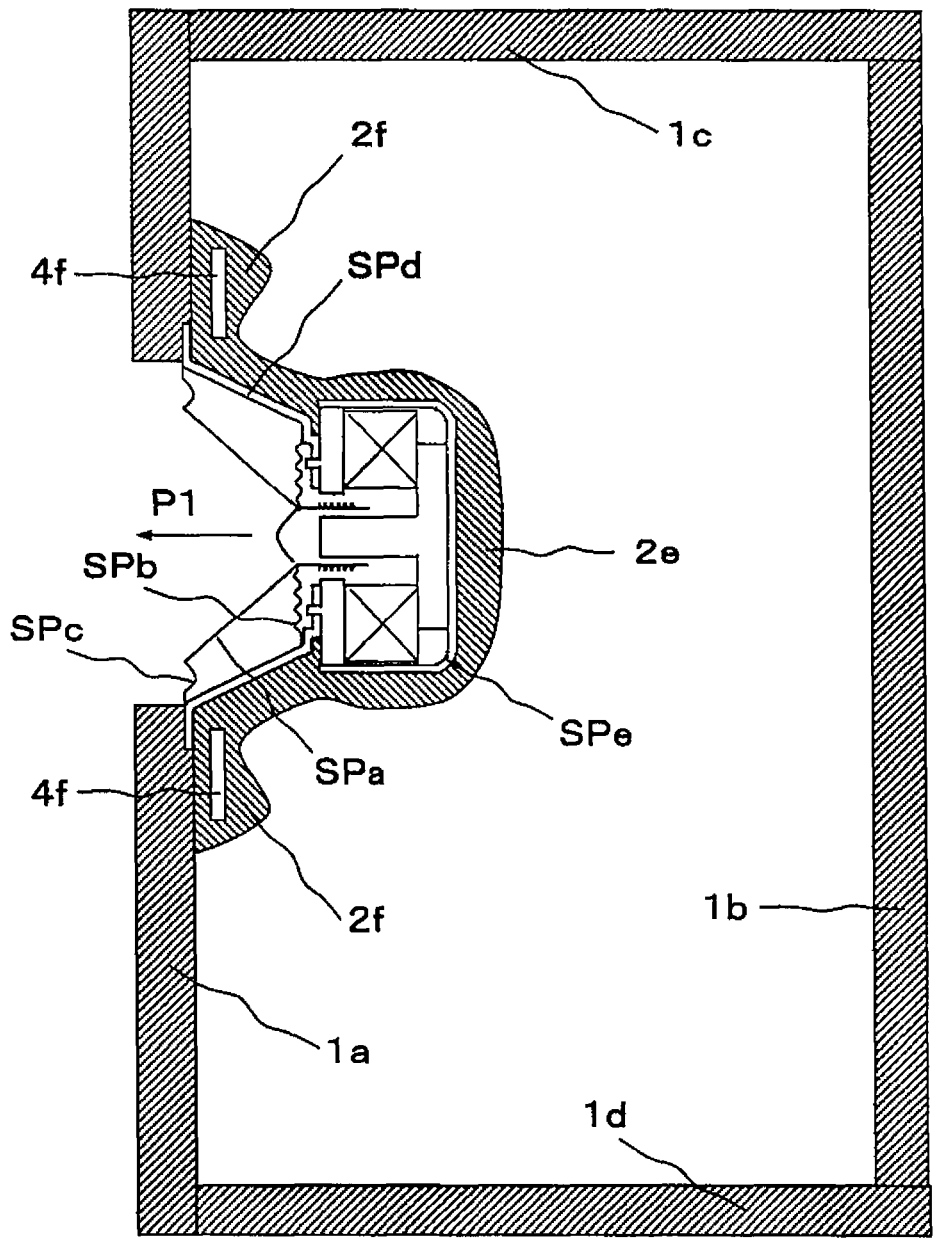
FIG. 4 is a drawing showing a loudspeaker system structure according to the embodiment 4 of the present invention, thereof it is the loudspeaker system of FIG. 3 with an auxiliary member having rigidity in the viscoelastic material layer of the baffle backside.

FIG. 4 is a representation of the cross-sectional structure of a loudspeaker system according to the embodiment 4 of the present invention. The embodiment 4 is a loudspeaker system of FIG. 3 with an auxiliary member having rigidity in the viscoelastic material layer of the baffle backside, the vibration of the baffle of the loudspeaker mounting area around it by the loudspeaker unit vibration is strong, since a thickness vibration damping by the damping layer is formed on the inside surface baffles against the vibration of the baffle of the loudspeaker mounting portion exceeds 10 mm, therefore having an auxiliary member having a rigidity among the layers becomes as close to the restraint vibration damping, It increases the effect of damping, to obtain a sound with little distortion. The material of the auxiliary member with the stiffness is the metal, such as iron plate of 3 mm thick, woody material, plastic material, moreover the rigidity enhance the effect of damping, that the viscoelastic material is damping the characteristic vibration of the auxiliary materials also bring.

Embodiment 5

Figure 5:
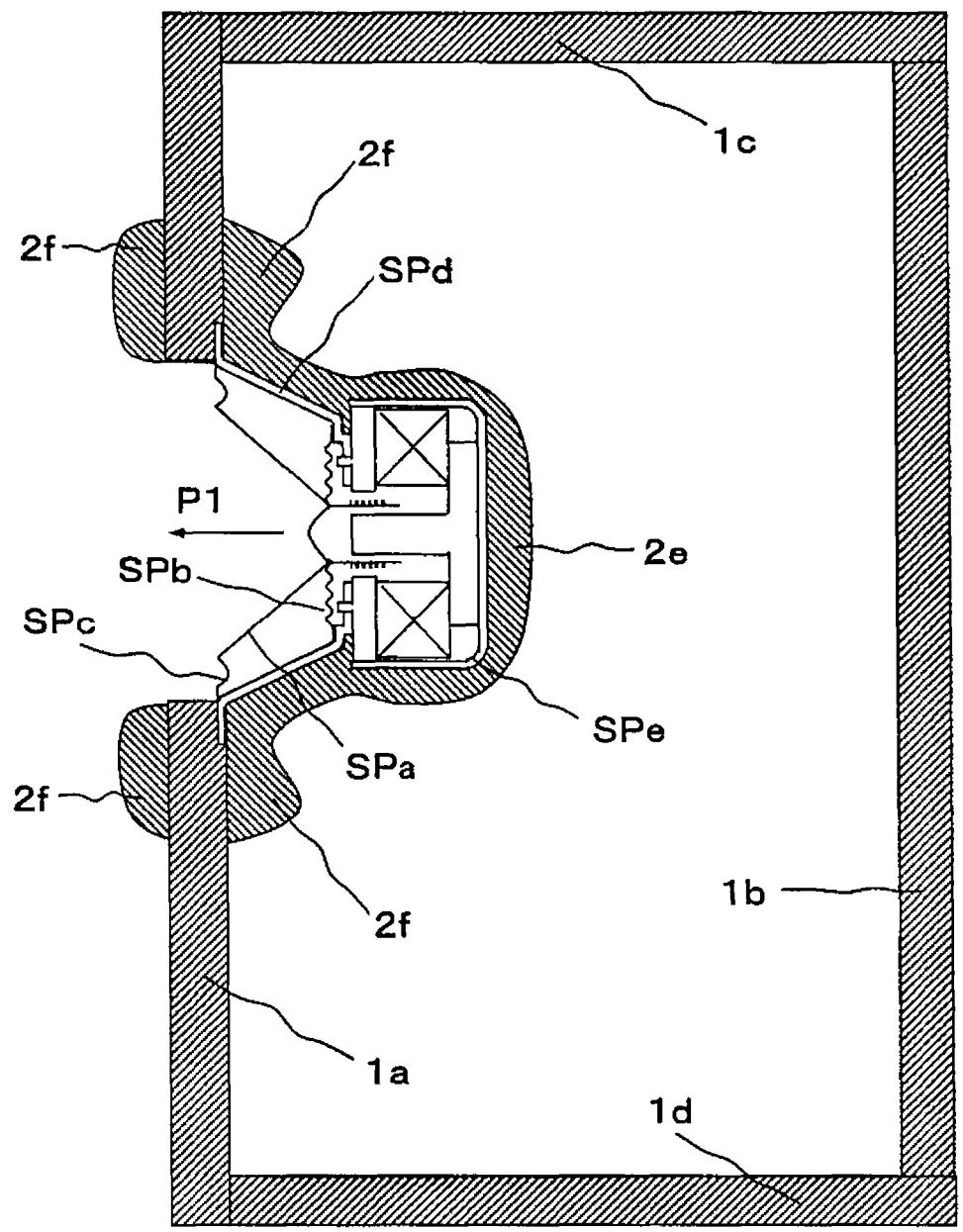
FIG. 5 is a drawing showing a loudspeaker system structure according to the embodiment 5 of the present invention, thereof it is the loudspeaker system of FIG. 3 that the viscoelastic material layer made of the viscoelasticity sealing material of denaturation silicone or polyurethane, or viscoelastic adhesive of denaturation epoxy, denaturation silicone epoxy, urethane or any mixture thereof, is formed with the entire annular larger 40 mm more than the loudspeaker unit mounting portion of the loudspeaker unit on the mounting baffle outside surface.

FIG. 5 is a representation of the cross-sectional structure of a loudspeaker system according to the embodiment 5 of the present invention. The embodiment 5 is the loudspeaker system of FIG. 3 with that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 2 mm or more with the entire annular larger 40 mm more than the loudspeaker unit mounting portion of the loudspeaker unit on the mounting baffle outside surface. This is to form the annular viscoelastic material layer 2f to vicinity of the loudspeaker unit mounting portion the outside surface of the cabinet, and this is due to the internal loss of the viscoelastic material, in addition to the suppression of vibration of the loudspeaker unit, the vibration of the peripheral baffle mounting portion of the loudspeaker unit is suppressed, it becomes the realization of sound with less distortion, then it becomes for the vibrating cone of the loudspeaker unit, a fine reproduction of the sound which has been masked, it becomes the improvement of the resolution and it is improving the reality. For the loudspeaker unit mount area around it, the vibration by the loudspeaker unit is large, so the suppression from both sides of the surface and back to enhance the inhibitory effect of this vibration, although but the surface side feels apparently strange, there are the effects of the suppression of surface vibration and of the preventing the release of resonance sound.

Embodiment 6

Figure 6:
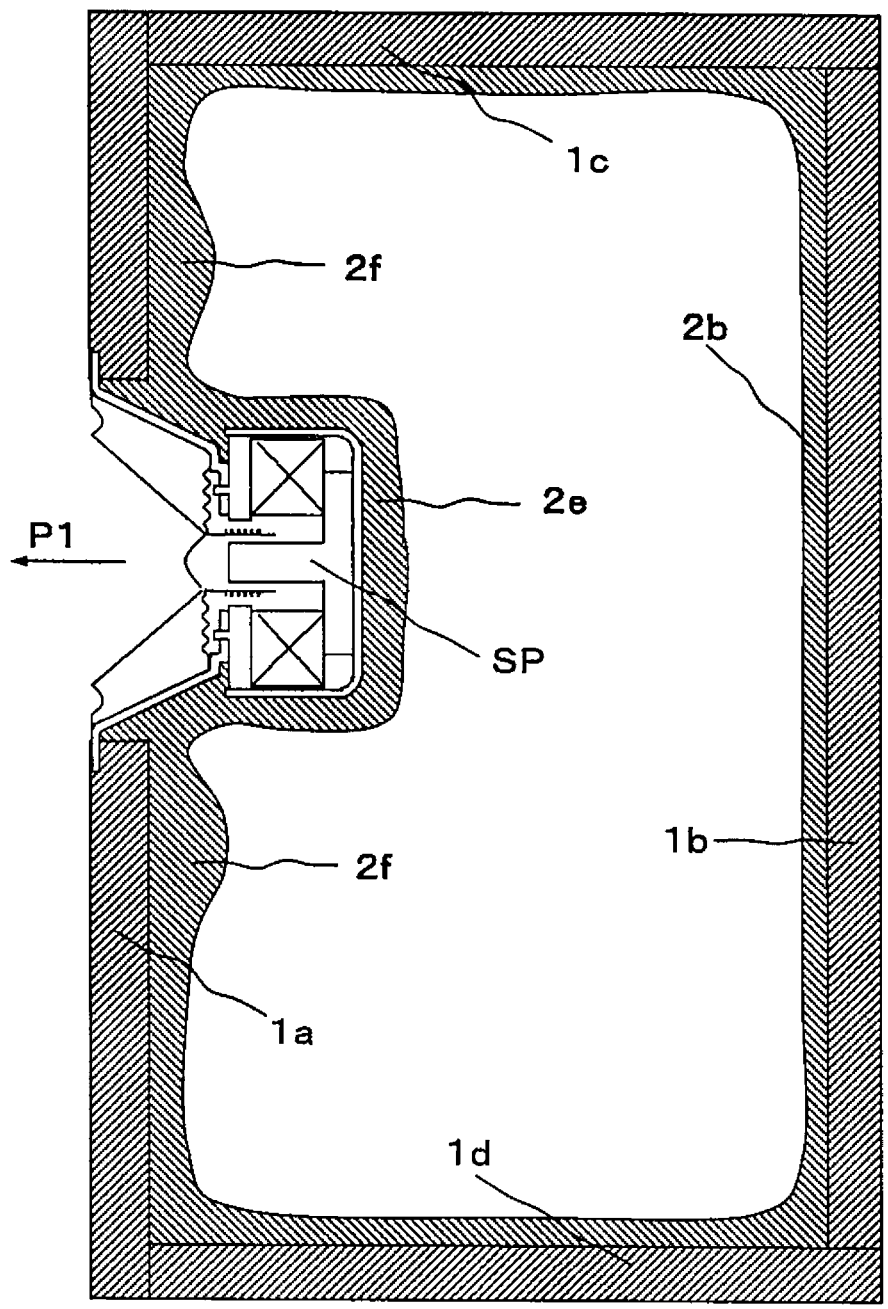
FIG. 6 is a drawing showing a loudspeaker system structure according to the embodiment 6 of the present invention, thereof it is the loudspeaker system of FIG. 3 formed a viscoelastic material layer for the entire area of each one of the outer or inner surface of the surface of all of the cabinet wall.

FIG. 6 is a representation of the cross-sectional structure of a loudspeaker system according to the embodiment 6 of the present invention. The embodiment 4 is the loudspeaker system of FIG. 3 with that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 1 mm or more in the region of more than 70% of the total area for at least one of the inner and outer surfaces of the cabinet wall. In FIG. 6, the viscoelastic material layer 2b is formed the entire surface of all of the inner surface of the cabinet, this is due to the internal loss of the viscoelastic material, the suppression of the surplus vibration all of the loudspeaker system except for the vibrating cone, is done, then the turbidity of the sound by the surplus vibration is reduced, and for the loudspeaker vibrating cone vibration P1, the forward emitted sound which has been masked by the cabinet vibration, becomes clearer and the effect is exhibited. The reason for damping the aim of the entire area of the loudspeaker cabinet wall, the occurring vibration is over the entire wall, on the effect is limited even if the damping certain area, there is no significant change in the vibrational energy, the resonance point also varies, so to form a viscoelastic layer around the whole walls comprehensive, an increase in internal loss, enhancements to the stress of expansion, compression, torsion slip by improving rigidity is achieved, therefore the vibration is suppressed.

The examples of the material of the cabinet panels. In addition to the plastic and wood, metal, ceramic, porcelain, glass, stone including the marble and concrete, but resonance, vibration or partial and surface vibration are associated, furthermore this is good way in increase of the sound by resonance to be brought into contact ring the orgel music box module. The viscoelastic materials for damping has affinity for these materials, and by the layer formation the resonance with banging sound and the orgel music box contact are reduced, so damping effect is confirmed. Although there are differences in the strength, all panels are vibrating, so there is necessity to damping all panels, the damping implementation leads to the realization of the less distortion sound. In this case, the vibration suppression effect of the viscoelastic layer is a little different in the outside or inside of the cabinet, in addition to the suppression of the wall vibration, there are the difference or suppression of partial vibration of the surface and the difference in the effect on the dissipation and reflection of sound, therefore the effect requiring confirmation is where about how to implement a thickness much, and including the points of view about appearance of the products with improving the appearance and the manufacturing process are selected.

Embodiment 7

Figure 7:
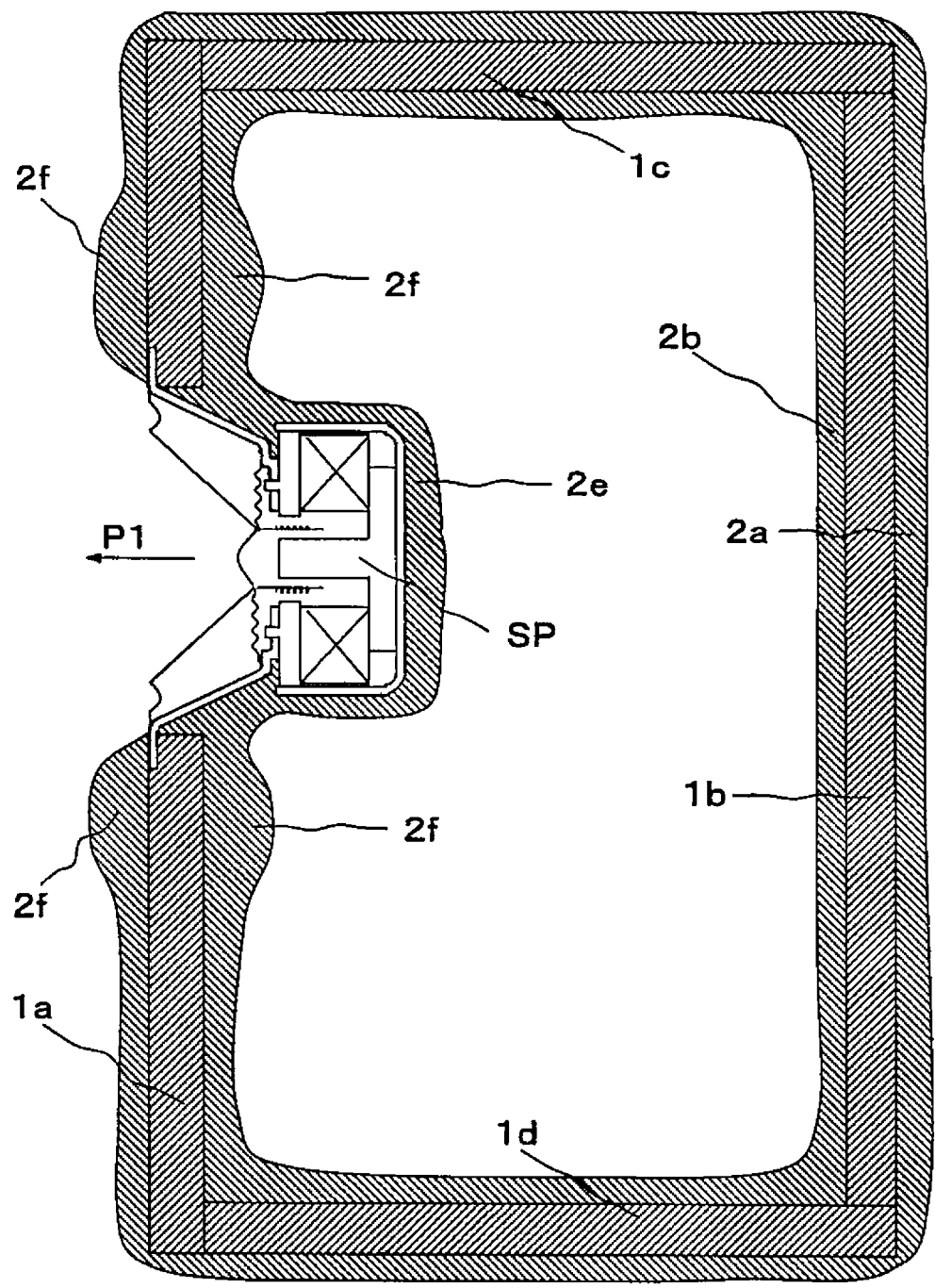
FIG. 7 is a drawing showing a loudspeaker system structure according to the embodiment 7 of the present invention, thereof it is the loudspeaker system of FIG. 5 for the entire area of each of the inner and outer surfaces of all aspects of the cabinet wall is formed a viscoelastic material layer.

FIG. 7 is a representation of the cross-sectional structure of a loudspeaker system according to the embodiment 7 of the present invention. The embodiment 7 is the loudspeaker system of FIG. 5 with that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 1 mm or more in the region of more than 70% of the total area for both of the inner and outer surfaces of the cabinet wall. In FIG. 7, the viscoelastic material layer 2*a* for the entire surface of all of the outer surface of the cabinet, the viscoelastic material layer 2*b* for the entire surface of all of the inner surface of the cabinet are formed, this is due to the internal loss of the viscoelastic material, so the suppression of the surplus vibration all of the loudspeaker system except for the vibrating cone, is done, especially the suppression of vibration cabinet is made from front and back, it becomes largest damping force, then the turbidity of the sound by the surplus vibration is reduced, and for the loudspeaker vibrating cone vibration P1, the forward emitted sound which has been masked by the cabinet vibration, becomes clearer and the effect is exhibited. The vibration force of the cabinet wall is large, then it is seen how the effects at the transition of the sound occurs with the increase of the thickness of the viscoelastic material, thereby the saturation point in many cases more than 10 mm.

Embodiment 8

Figure 8:
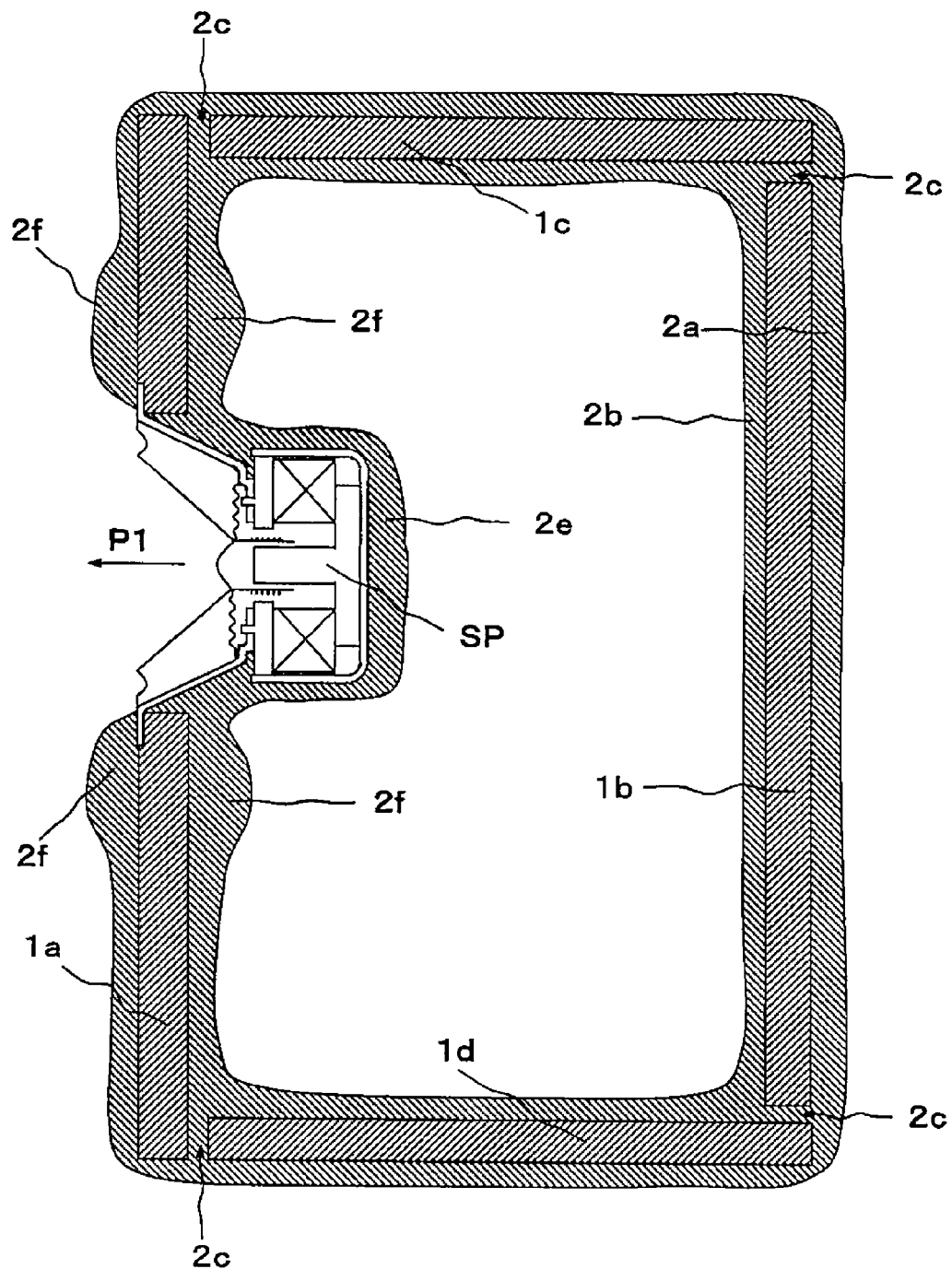
FIG. 8 is a drawing showing a loudspeaker system structure according to the embodiment 8 of the present invention, thereof it is the loudspeaker system of FIG. 7 with the cabinet wall all each junction area, the viscoelastic material layer is formed.

FIG. 8 is a representation of the cross-sectional structure of the speaker apparatus according to the embodiment 8 of the present invention. The embodiment 9 is the loudspeaker system of FIG. 7 with that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 1 mm or more for all each junction area of the cabinet walls. To form viscoelastic material layer 2*c* with a thickness of 1 mm or more on the region of the cabinet wall all each junction area is suppressed in the solid propagation of vibration to the adjacent wall of each, because the cabinet vibration from rear surface of the loudspeaker unit is the same energy as sound and vibration from front of the loudspeaker unit, and the vibration generated on each side of the cabinet in the air propagation is large, moreover the vibration caused by the solid vibration propagation from the loudspeaker frame is added to this, and each other interference vibration of each face are interconnected transmission as a solid vibration propagation, so the turbidity of the sound by cabinet is confirmed by a grand piano sound in particular, therefore it is intended to keep each wall in the vibration by forming a viscoelastic material layer in the same manner as the vibration damping wall vibration and isolates the vibration.

In the fabrication, on the each panel surface of the outside surface, the inside surface and the junction surface, of constituting a cabinet, is formed the layer more than 1 mm and is dried, then add coated with a viscoelastic material panel to the end face of each surface and is dried by bonding without pegs or screws. Thereby, with the suppression of surplus vibration by viscoelastic material layer formation on the cabinet surfaces, and the buffer of solid vibration propagation of the cabinet between each face is made, especially the aggregation of vibration to the front baffle 1*a* is reduced, the solid vibration propagation returned to the loudspeaker unit is reduced. Thus, for the loudspeaker vibrating cone vibration P1, the forward emission sound which has been masked by the cabinet vibration, becomes clearer, and the effect is confirmed to become clearer piano sound.

Embodiment 9

Figure 9:
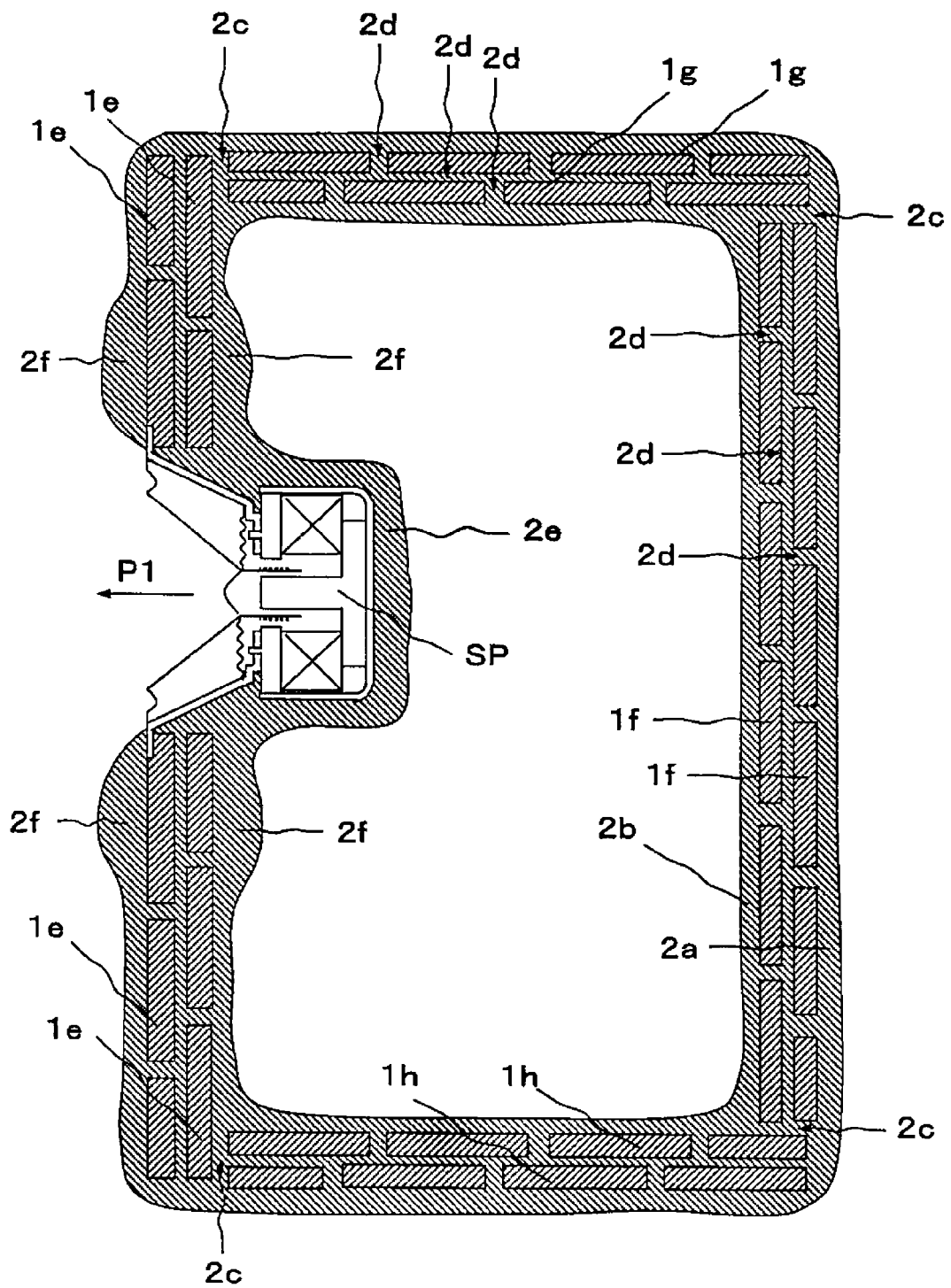
FIG. 9 is a drawing showing a loudspeaker system structure according to the embodiment 9 of the present invention, thereof it is the loudspeaker system of FIG. 8 for cabinet wall is formed by assembled by the formation of the viscoelastic material layer, the wall configuration material subdivided.

FIG. 9 is a representation of the cross-sectional structure of the loudspeaker system according to the embodiment 9 of the present invention. The embodiment 9 is the loudspeaker system of FIG. 7 with that the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 0.5 mm or more by aggregation of the wall configuration material subdivided as cabinet wall. As shown in FIG. 9, with respect to the loudspeaker cabinet wall, it is to configured to aggregate the constituent material 1*e* subdivided the front baffle, the constituent material 1*f* subdivided the rear panel, the constituent material 1*g* subdivided the top panel, the constituent materials 1*h* subdivided bottom panel, to form in the 2 mm by a viscoelastic material layer 2*d* made of the viscoelasticity sealing material of denaturation silicone and polyurethane, or viscoelastic adhesive of denaturation epoxy, denaturation silicone epoxy and urethane or any modified type. for example it is possible to configure to assembled small wood pieces 100×30×15 mm each side of the cabinet configuration by the viscoelastic material. In the fabrication, the panels made by assembly by applying a viscoelastic material by collecting pieces of wood on the plane, and the panels are superposed by further viscoelastic material when it is a multilayer. Further, it will be assembled by applying a viscoelastic material without screws or pegs, however, by increasing the thickness of the outside viscoelastic material layer and the inside viscoelastic material layer of the cabinet, the degradation of surface strength is prevented.

Thus in FIG. 9 the viscoelastic material layer is formed on the piece of wood between each place, so the strong resonance vibration of the of each panel size of the cabinet which is difficult to eliminate by only increasing the thickness of the viscoelastic material layer, is less likely to occur, the generation of sound almost eliminated even hitting the cabinet each side, and the characteristic vibration of the cabinet panels are reduced is shown. There is also a reduction effect of solid transmission at the same time, the vibration suppression also increases the effect by the viscoelastic material layer 2*a* of the cabinet outside, the viscoelastic layer 2*b* of the inside, so the vibration of the entire cabinet, part vibration, surface vibration and mutual interference of each panel vibration is reduced. Thus, for the loudspeaker vibrating cone vibration P1, the forward emission sound which has been masked by the cabinet vibration, becomes clearer, and the effect is confirmed to become clearer piano sound.

Embodiment 10

Below is a description of the embodiment 10 of the present invention.

Figure 10:
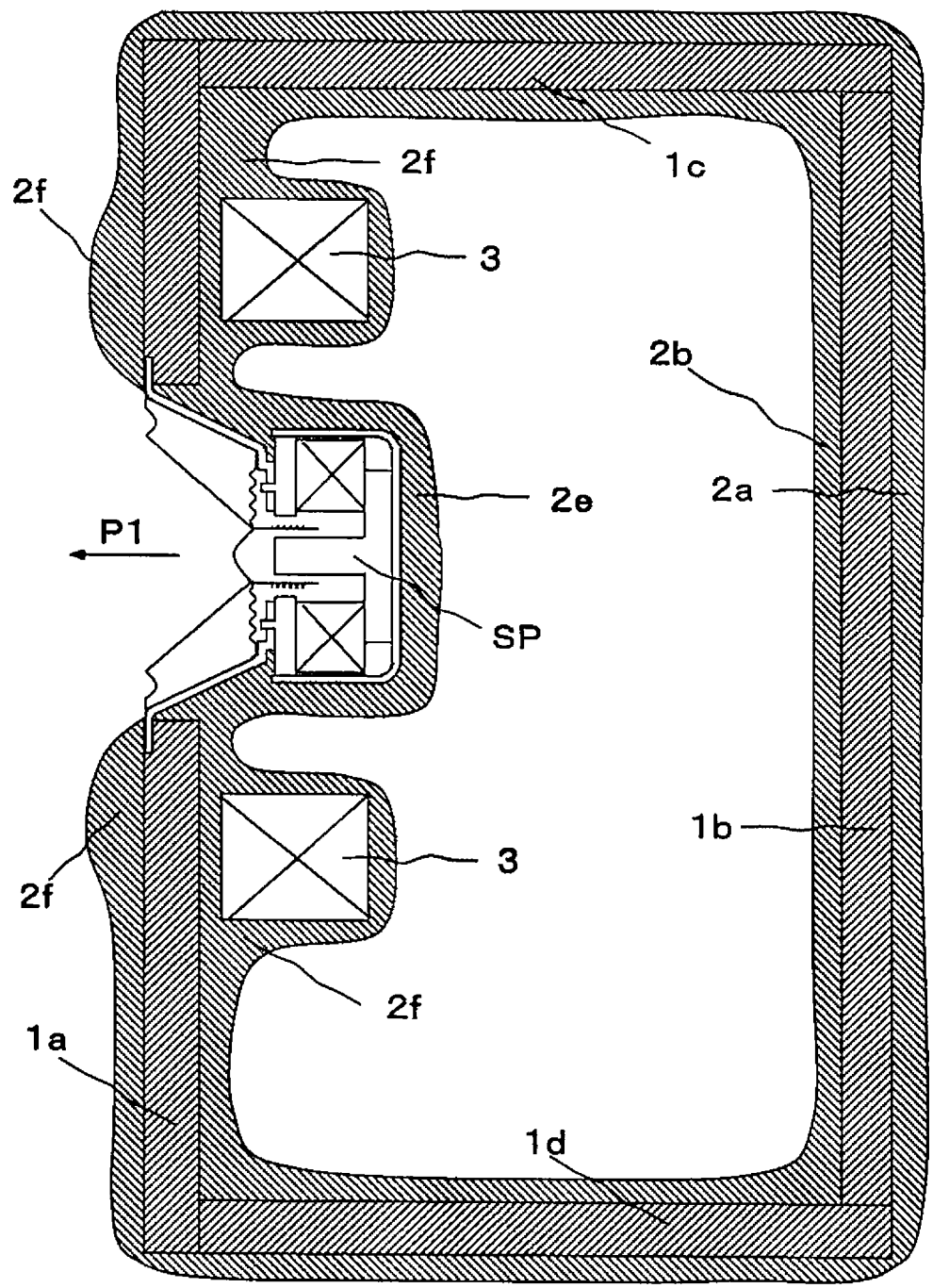
FIG. 10 is a drawing showing a loudspeaker system structure according to the embodiment 10-1 of the present invention, thereof it is the loudspeaker system of FIG. 7 with heavy weight.

FIG. 10 is a representation of the cross-sectional structure of the loudspeaker system according to the embodiment 10-1. The embodiment 10-1 is a loudspeaker system of FIG. 7 with that the heavy weight is disposed. As shown in FIG. 10, into a viscoelastic material layer made of the viscoelasticity sealing material of denaturation silicone or polyurethane, or viscoelastic adhesive of denaturation epoxy, denaturation silicone epoxy, urethane or any mixture thereof, that arranging the heavy weight 3 of several times more than the loudspeaker weight on the cabinet wall, is done as a measure to the vibration P6 caused by the action and reaction of the vibrating cone vibration of the loudspeaker unit in FIG. 23. Conventionally to reduce the vibration P6 by this action and reaction, the arranging heavy weight behind the magnet of the loudspeaker have been conducted, but conjointly to decrease the effect of vibration action and reaction, the occurrence of the complex vibration such as the respective part vibration of the loudspeaker frame, the vibration of heavy weight own, is accompanied as secondary disorder.

In the present embodiment, in order to reduce the vibration by action and reaction P6 effectively, by suppressing the loudspeaker frame vibration in viscoelastic material, further the heavy weight 3 is arranged around the loudspeaker mounting mount into the viscoelastic material layer. In order to not affect the magnetic circuit of the loudspeaker, the heavy weight is desirable non-magnetic material, but this does not apply if the magnetic shield is made by the loudspeaker unit. Preferably the heavy weight is in the annular on both sides or outside or inside of the cabinet of the loudspeaker mount, and by the effect of the viscoelastic material layer and the heavy weight, the reduction of vibration of the loudspeaker frame SPd, the reduction of the part vibration, the surface vibration of the entire front baffle 18, the reduction of vibration P6 by action and reaction are applied further. By the heavy weight of more than several times of the loudspeaker unit, it becomes as close to a stationary point of the non-vibrating loudspeaker unit, then this results in the calm of sound, with feeling as was gentry sound, and the reproduction of fine sound is improved, and clear piano sound is recognized.

Figure 11:
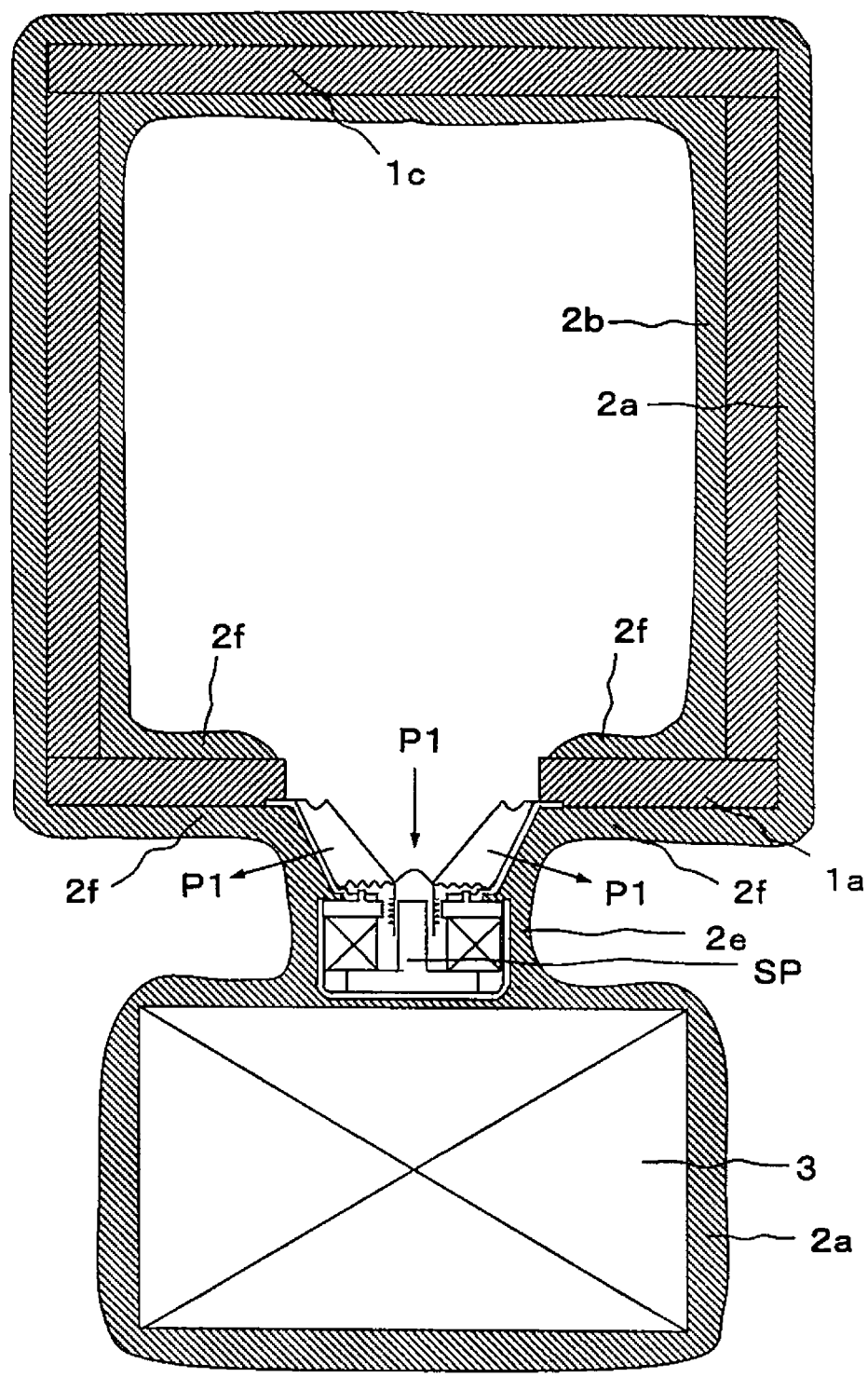
FIG. 11 is a drawing showing a loudspeaker system structure according to the embodiment 10-2 of the present invention, thereof the new embodiment arranging the heavy weigh is shown.

FIG. 11 is a representation of the cross-sectional structure of the loudspeaker system according to the embodiment 10-2. This embodiment 10-2 although an arrangement of the heavy weight of the same manner as in embodiment 10-1, but structure is significantly different, the arrangement is these, first by arranging a large heavy weight 3 at the bottom and damping by forming a viscoelastic material layer, on it, the loudspeaker unit upside-down is arranged by the magnet section down, on it, the cabinet is arranged with a viscoelastic material layer in the inner and outer, and the viscoelastic material layer is formed about the outside such as the entire loudspeaker frame.

This structure is the direction of the sound output from the loudspeaker unit becomes opposite against usually direction, it becomes release of the sound of the omni-directional sound, and it is possible to greatly heavier heavy weight, so the effect of reduction of action and reaction vibration is greatly expected. But the loudspeaker frame that is hidden in the cabinet normally, so come out to the outside, the vibration in the magnet portion and frame is able to listen as all sound. Therefore by the formation of the viscoelastic material layer to the loudspeaker backside surface of normal, the vibration suppression is requiring further. If the vibration is suppressed to overcome this, it becomes less sound distortion, so it is the new style of the loudspeaker system. By being a reverse mounting, there is a sound emission of reverse phase with damper, but the damper is not a problem because of the breathability.

Embodiment 11

Figure 12:
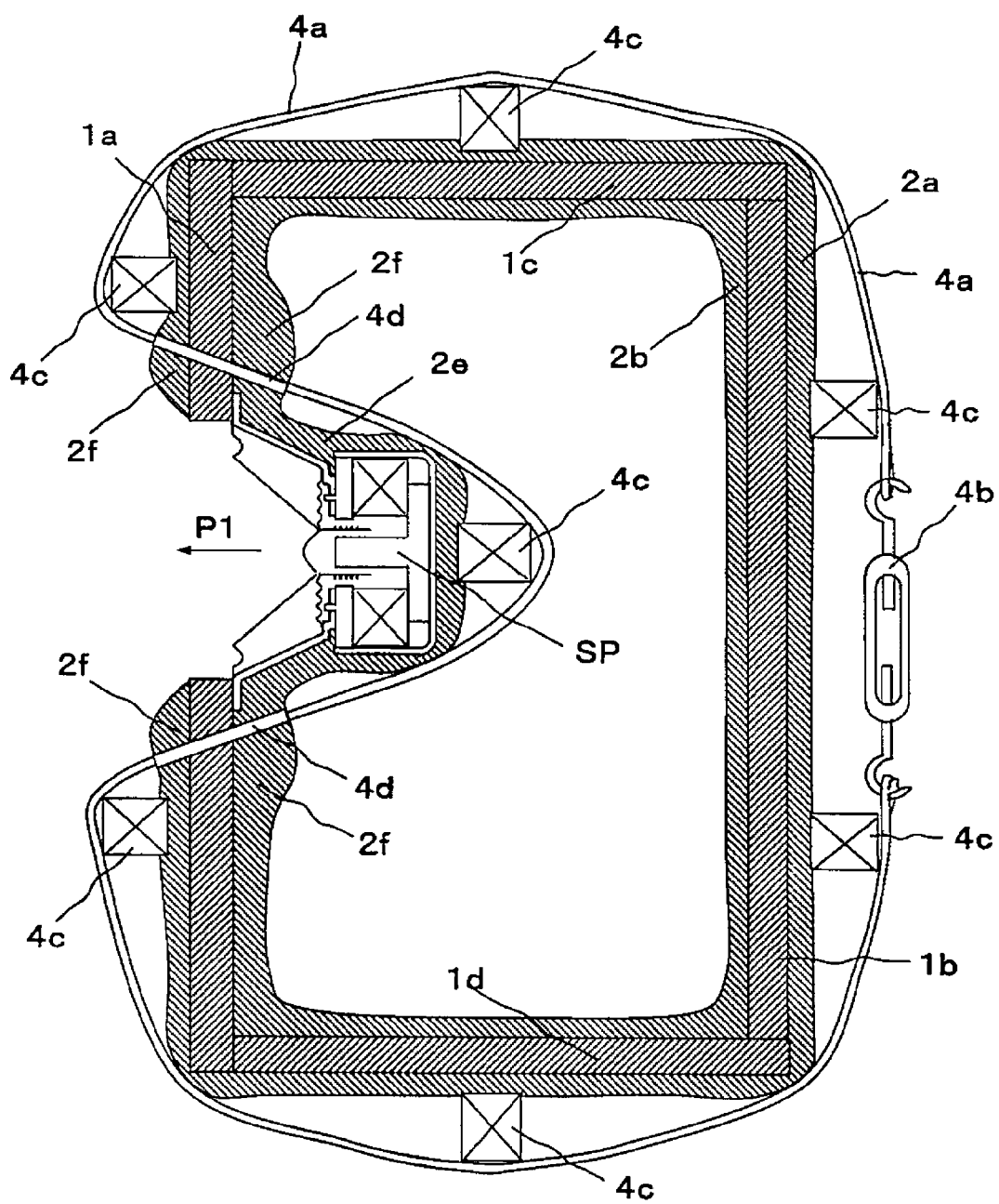
FIG. 12 is a drawing showing a loudspeaker system structure according to the embodiment 11 of the present invention, thereof it is the loudspeaker system of FIG. 7 has given pressurization from the outside of the viscoelastic material layer by binding member.

FIG. 12 is a representation of the cross-sectional structure of the loudspeaker system according to embodiment 11 of the present invention. The embodiment 11 is a loudspeaker system of FIG. 7 given the pressurization from the outside of the viscoelastic material layer by binding member. As shown in FIG. 12, the cabinet vibration and the vibration of the cabinet constituting of the loudspeaker backside such as a loudspeaker frame, is suppressed by viscoelastic material layer, furthermore, on top of the layer the binding member 4a such as coated wire and the tension applying member 4b such as a turnbuckle, with the space member 4c, are added the preload on cabinet each constituent panels and the loudspeaker frame, further it may be applied to viscoelastic material around binding member. This is the reduction of the surplus vibration of the cabinet and the loudspeaker frame by viscoelastic material, in addition to the damping effect of the cabinet and the loudspeaker frame by pressurization further, at the same time it is intended to prevent the viscoelastic material by a new vibration generation by itself binding member. Therefore for the loudspeaker vibrating cone vibration P1, the forward emission sound which has been masked by the cabinet vibration, becomes clearer, the further reduction of the surplus vibration caused by the pressurization leads to improvement of the reality of the sound of the rise and fall of the percussion in particular.

FIG. 12, it becomes pressurized including the loudspeaker unit, it is pressurized to both the cabinet and the loudspeaker unit, and although the purpose of vibration suppression overall effect to the loudspeaker system the entire, but there is a need to be careful enough deformation of the cabinet and the loudspeaker unit by over-tightening because a generation of sound distortion. As wire route, there are around the cabinet outside route, the inside of the loudspeaker system and around the cabinet back out of the side route, including the number route of the space members height, so select optimally while checking the pressure given state. The way of applying tension may be a twist-up of the wire, rather than a mechanism such as a winch and turn buckle, however, it is necessary and sufficient power and to deal with slack.

Embodiment 12

Below is a description of the embodiment 12 of the present invention.

Figure 13:
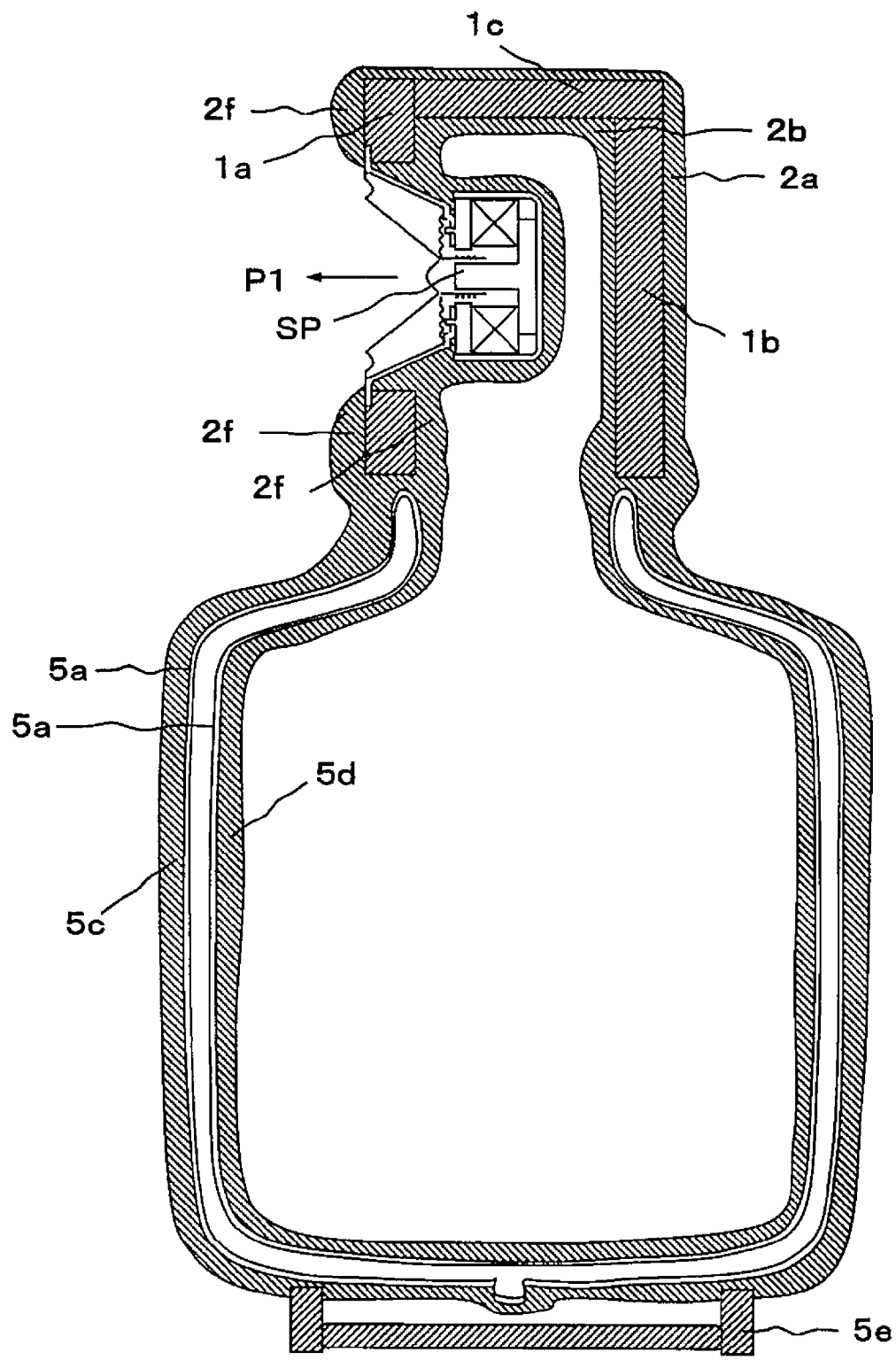
FIG. 13 is a drawing showing a loudspeaker system structure according to the embodiment 12-1 of the present invention, thereof using thermos as the main volume portion of the cabinet part, for the entire area of the inner and outer surfaces of the thermos, is formed a viscoelastic layer.

FIG. 13 is a representation of the cross-sectional structure of the loudspeaker system according to the embodiment 12-1. The embodiment 12-1 is a loudspeaker system of according to claims 1 to 2, for the thermos as the main part of the cabinet space with the loudspeaker unit, the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 1 mm or more in the region of more than 70% of the entire area of the inner and outer surfaces of the thermos. As shown in FIG. 13, pot-shaped thermos 5a is arranged, and the structure constituted a viscoelastic material layer, it forms a viscoelastic material layer on the inner surface 5c and an outer surface 5d thereof, configures about loudspeaker units surrounding structures by 1a, 1b and 1c, to form a viscoelastic material layer 2a•2b•2f on the outer surface and the inner surface of the loudspeaker unit, and the viscoelastic material layer is also configured connection with the thermos further.

Availability is good at a low price is pot-shaped thermos, is up to capacity of about 3 liters, the most important feature of the use of as a loudspeaker cabinet is that to make the cut-off of the sound of the vacuum layer for thermal insulation effect, the sound transmitted to the outside from the inside through the stainless steel surface, and form a viscoelastic material layer in order to prevent the generation and propagation of the vibration of the inner and outer surfaces of the thermos, and performs the damping by the internal loss. Therefore the light weight cabinet appeared with the strong rigidity, in addition to the vibration is smaller with respect to the cabinet vibration, the decay is early, the good impact of good crisp is given to the front emission sound of the loudspeaker unit, moreover there is an advantage in less external release of sound from the cabinet. Although it is suppressing the vibration of metal about 0.5 mm by the viscoelastic material application, enough next to the damping is more than 1 mm, obtained the damping of saturation close to 100% do cover 70 percent.

Figure 14:
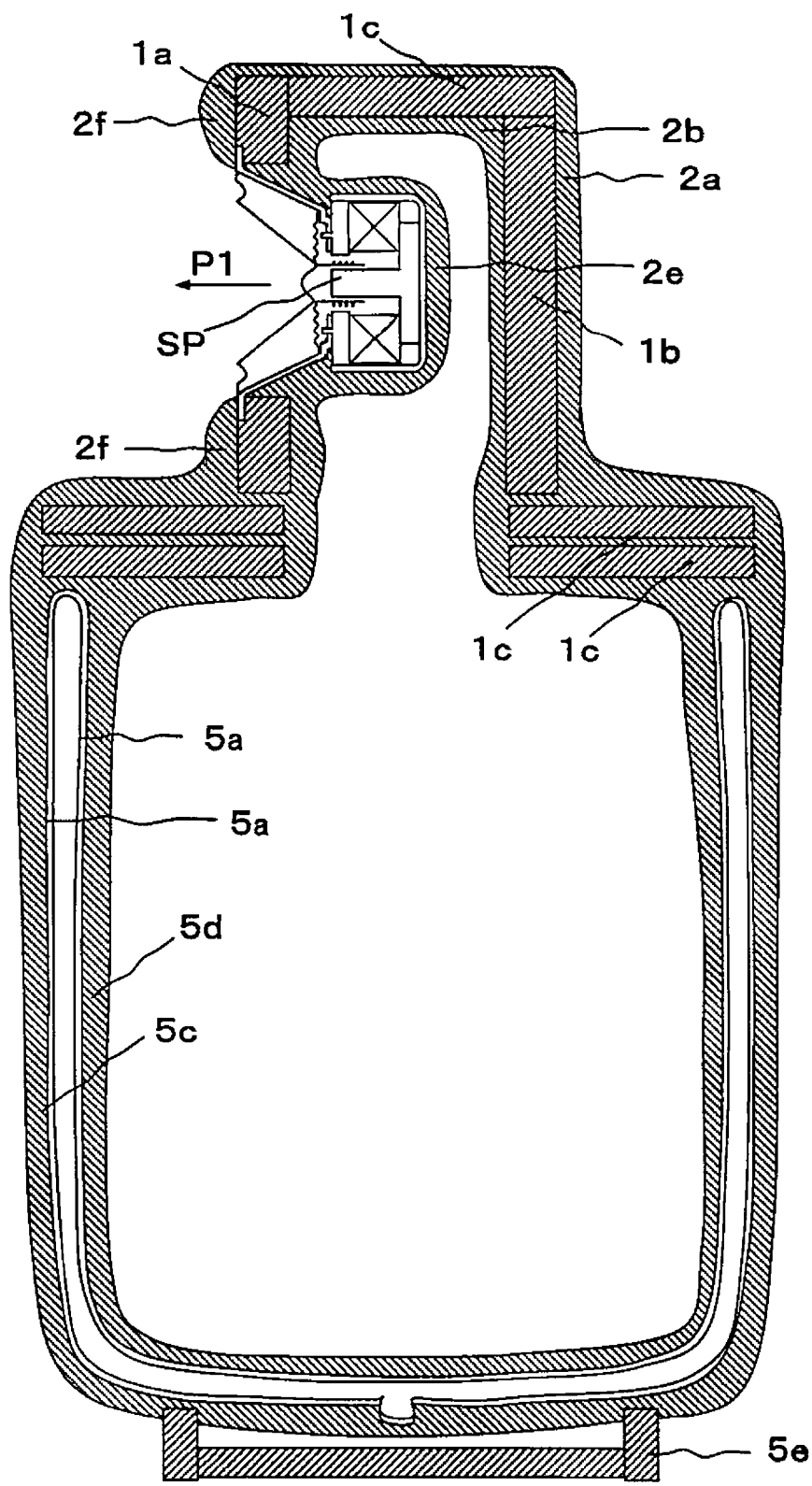
FIG. 14 is a drawing showing a loudspeaker system structure according to the embodiment 12-2 of the present invention, thereof the wide-mouthed thermos stainless steel is used for the cabinet.

FIG. 14 is a representation of the cross-sectional structure of the loudspeaker system according to the embodiment 12-2. The embodiment 12-2 is a novel embodiment of a thermos in capacity than the pot-shaped. When it comes to large capacity, it becomes wide-mouthed thermos, so there are culinary uses heat insulation jar and lunch jar, the opening is large in order to take advantage of the features of the thermos, between the wide-mouthed thermos and loudspeaker unit section, it is required to be addressed to reduce vibration in the viscoelastic material layer and the plate of the double, therefore the speaker system with good sound quality due to the use of thermos large capacity can be realized. With the speaker unit of large caliber, the loudspeaker system is needed the large capacity thermos as a cabinet but it is wide mouth. If this is to match the caliber of the speaker unit, the formation of the viscoelastic material layer to the mounting portion and the inner and outer thermos, so it is available as a loudspeaker system, but if the direction and caliber is not matching, the use of a thermos with the structure of FIG. 14. If the capacity is needed as the speaker, cabinet further, even in a thermos jar shape in pot shape thermos, the connecting portions are made, so two consolidated, three consolidated, four consolidated, the development of the large structure is possible.

Embodiment 13

Figure 15:
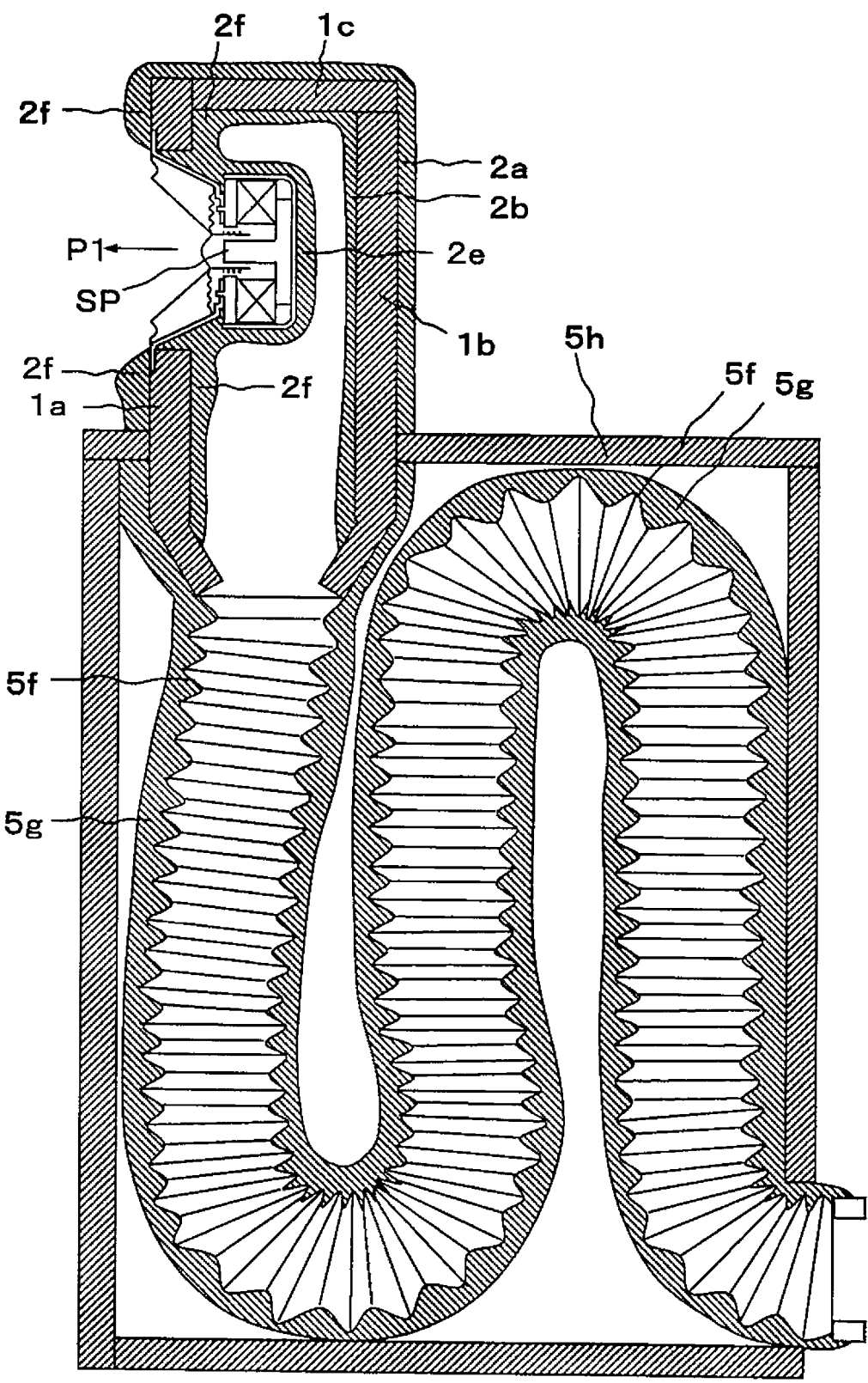
FIG. 15 is a drawing showing a loudspeaker system structure according to the embodiment 13 of the present invention, thereof the bellows is used duct is bent as the main volume portion of the cabinet part, the viscoelastic material layer is formed for the entire area of the outer surface of the bellows ducts.

FIG. 15 is a representation of the cross-sectional structure of the loudspeaker system according to the embodiment 13 of the present invention. The embodiment 13 is a loudspeaker system of according to claims 1 to 2, for the bellows duct used to bend as the main part of the cabinet space, the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 2 mm or more in the entire area of the outer surfaces of the bellows duct. The bellows duct 5f is used in the main part capacity of the cabinet of the loudspeaker system, the bent for internal reflection of sound, is used in a range that do not fit stretch bellows, a viscoelastic material layer 5g is formed with a thickness of 2 mm or more with the entire outer surface of the bellows duct. In the actual production, the duct but significantly longer for speaker, this is shown as a basic structure in FIG. The outer surface is damping for vibration control of the duct, the structure of the stiffness and the prevention of contact between the ducts, the thickness as good as thick, it is not a uniform for irregularities, but it is effect damping sufficient by covering the whole to have a thickness of 2 mm or more.

Figure 16:
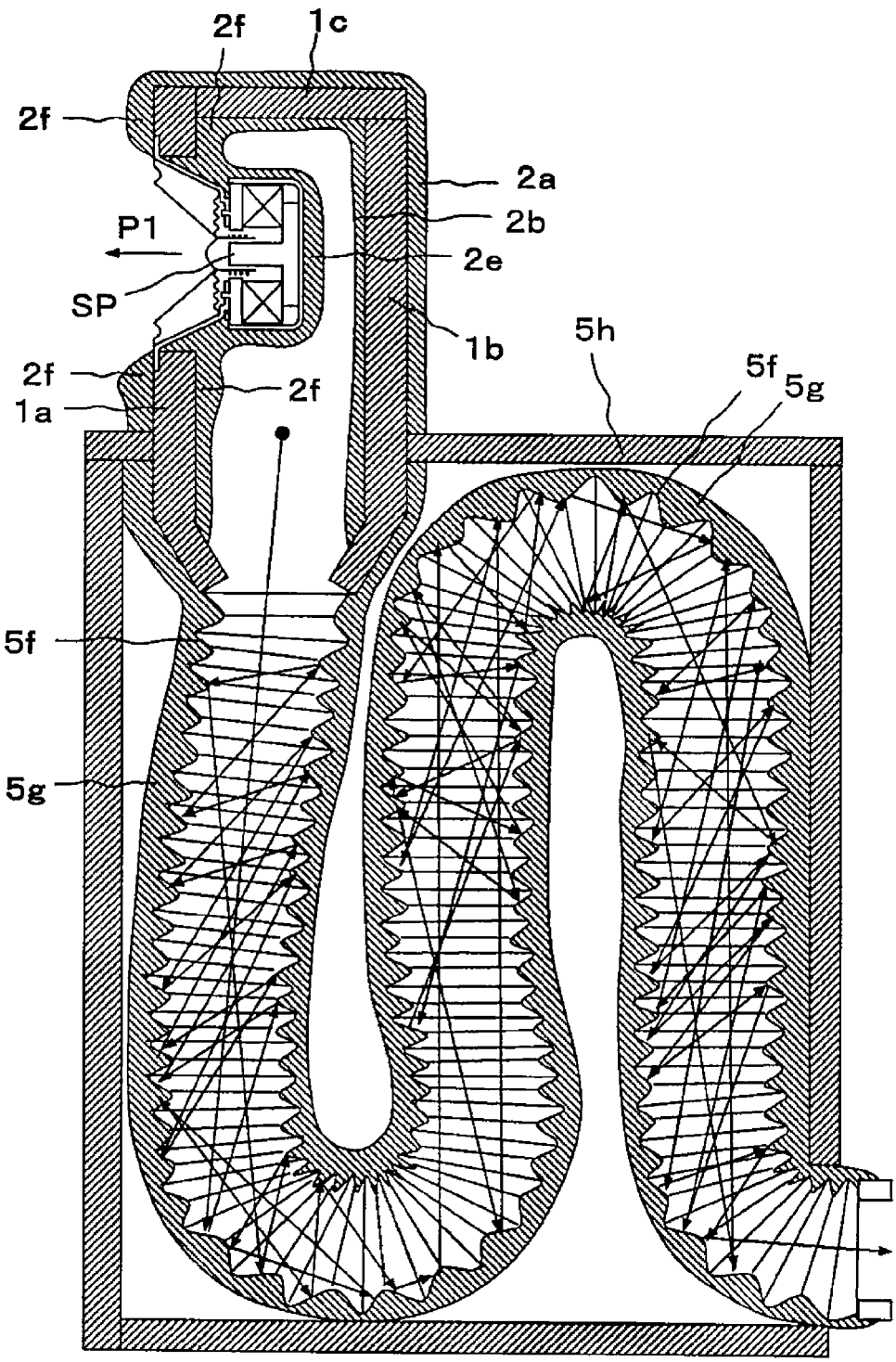
FIG. 16 is a drawing showing a loudspeaker system structure according to the embodiment 13 of the present invention, thereof in the bellows duct within the bent generation of sound waves from the loudspeaker unit backside reflective state is shown.

About actual fabrication, the various flexible exhaust ducts, exhaust duct diameter 80 mm, 4 mm degree high to low, exhaust duct diameter 11 mm, 5 mm degree high to low, bellows aluminum duct to the kotatsu foot warmer from fan heater diameter 110 mm, 0.8 m contraction length, 2.7 m maximum length, 5 mm degree high to low, it is allowed to meander without fit stretched while being stretched for each, further the formation of the viscoelastic material is made for vibration suppression for the entire duct outside. Therefore the resonance reverberation booming in the tubular body, in addition to the lack of it, the diffuse reflection of sound in the bellows, the sound to a low frequency corresponding to the tube length of several times is reproduced. Moreover the box that looks like a normal cabinet, it is necessary for the appearance of the loudspeaker system and the self-standing of the loudspeaker system, but all the functions of the loudspeaker cabinet is depend on the bellows duct, so good without the box. FIG. 16, in the first embodiment 13, it is a representation of the state of the reflected sound in the duct, by repeated reflection at the duct, the effective duct length is equivalent to the number of times or more, so possible reproduction of low frequencies is provided.

From the above examples, the damping due to internal loss of viscoelastic material layer to the cabinet and the frame of the loudspeaker unit of the present invention, becomes the vibrating cone vibration in the form close to a stationary point of non-vibrating for the loudspeaker unit. The less distortion crisp sound is realized. It indicates that it is useful to realize the original performance of the loudspeaker unit has, so this will realize the original value of the current loudspeaker unit. That there are various embodiments is that deployment corresponding to that if possible, is a realization of the high quality sound than conventional in the general band products and the small loudspeaker system for PC, and in high class band products it is realization of the sound more realistic. Also the sound quality can be realized use of materials such as wood, even if less than conventional, therefore it is also recommended from the point of view of ecology. With the society as well as aging, the role of satisfaction of mind about the sound is large, so goodness of the sound becomes comfort and an increase of charm to life. Also the realization of the sound emission of vibration from the non-vibration stationary point, also promotes further progress, such as vibrating cone and vibration mechanism. The present invention is an additional application to the conventional process, further the application by adding after completion, the application as an improvement by adding after the use may be, so this is an extension of life with improved quality. In addition, even for improvement and work breakdown, because of softness a cutting is possible, so that the joint surface can be re-joined without the boundary surface is also a feature.

Further, to continue the description of the preferred embodiments.

Embodiment 14

FIG. 2 is a representation of the cross-sectional structure of the loudspeaker system according to the embodiment 14 of the present invention. The embodiment 14 is a loudspeaker system, the two loudspeaker units is arranged near back and forth in the same direction, to form a common sound chamber from back area of the outside sound emission loudspeaker area to back area of the internal loudspeaker, by negative phase polarity driven, to connect from front area of the internal loudspeakers to the cabinet area. The common sound chamber 6 formed between the SP1 and SP2 front and rear loudspeaker units is isolated between the cabinet vibration and the front loudspeaker unit SP1, and the common sound chamber 6 becomes noise canceling state by the back assist, hither the reduction of the action and reaction vibration P6 is performed by driving in the opposite direction to each other two speaker units, and to improve the quality of the emitted sound is made. Furthermore the reduction the vibration of the common sound chamber 6 and vibration P3 of the cabinet are so necessary, in this FIG. the forming 2*a*•2*b*•2*e*•2*f* of the viscoelastic material layer of claim 12 is also illustrated, and the isolation structure is made to the common wall between forming part of the common sound chamber 6 by a pair of loudspeaker units, and the cabinet section 1, the entry through the wall of the cabinet vibration P3 is prevented. The FIG. represents a cross-sectional structure, the width at a view from the front of the left side of FIG. is slightly larger than the loudspeaker width or is several times, the cabinet width is formed by a common sound chamber width slightly larger than the loudspeaker width, and the loudspeaker frame part in the figure although looks backward emission of the sound to not allow to form a viscoelastic material layer therein, there are the plurality of large holes in the speaker frame, no problem occurs also with respect to the rear sound emission of from the vibrating cone after the formation of the viscoelastic material layer to the frame.

The examples of the material of the cabinet panels, in addition to the plastic and wood, metal, ceramic, porcelain, glass, stone including the marble and concrete, but resonance, vibration or partial and surface vibration are associated, furthermore this is good way in amplification of the sound by resonance to be brought into contact ring the orgel music box module. The viscoelastic materials for damping by the viscoelastic material layer formation has affinity for these materials, and by the layer formation the resonance with banging sound and the orgel music box contact are reduced, so damping effect is confirmed. The viscoelastic material layer is formed by viscoelasticity sealing material of denaturation silicone or polyurethane, or viscoelastic adhesive of denaturation epoxy, denaturation silicone epoxy, urethane or any mixture thereof, with a thickness of 1 mm or more, in the region of more than 70% of the total area of the loudspeaker frame back surface except for the part required for installation and moving parts such as edge, damper and vibrating cone of the loudspeaker unit, in the region of more than 40% of the total area of the cabinet wall outside and inside, therefore the viscoelastic material layer in the wide area is converted from vibration energy to thermal energy by the large internal loss, and is provided the reduction of the unnecessary surplus vibration and the sound distortion. From the point of view of the damping, the formation of a viscoelastic material layer of the entire area of the inner and outer surfaces of the cabinet, is also desirable of a thickness exceeding 6 mm, but the 40% of the total area is from the point of view of appearance, for example, the selection about all application only inside is shown. For application area of the loudspeaker unit, the backside entire area of the loudspeaker unit is preferred, but the required range if squeezed, as essential aspects of the frame and the concave point of the frame in the frame and the concave point of the frame and magnet cover formed backside, the application area is required a region more than 60% of the whole area.

The viscoelastic material of viscoelasticity sealing material of denaturation silicone or polyurethane, or viscoelastic adhesive of denaturation epoxy, denaturation silicone epoxy, urethane or any mixture thereof, has the property of containing both the viscosity and elasticity, and the viscoelastic material is effective for suppressing vibration due to large internal loss, especially the sealant denaturation silicone as a representative Cemedine POS seal SM-444, affinity is good, there is no liquidity, durability is good, and more than anything the resonance after solidified even thicker by recoating less, moreover, the rigidity also increases, therefore it is a good material as vibration suppression of the loudspeaker system. The loudspeaker frame part in the FIG. 2 although looks at first glance the figure backward emission of the sound to not allow to form a viscoelastic material layer therein, there are the plurality of large holes in the loudspeaker frame, no problem occurs also with respect to the rear sound emission after the formation of the viscoelastic material layer to the frame. When coating, ensuring the adhesion surface strength of the loudspeaker unit is important, making a primer treatment or alcohol degreasing is required. The technology form of the cabinet is a closed box type in the FIG., not only a closed box type, bass reflex type of phase inversion, open back enclosure type, back load horn type, and including the damping due to the formation of the viscoelastic material layer, with the benefits in the present invention of the plurality of loudspeaker arrangement is benefits of less distortion, crisp sound, and less surplus vibration, the effect is expressed in the overlaying the benefits of those types to the merits.

Embodiment 15

Below is a description of the embodiment 15 of the present invention.

Figure 18:
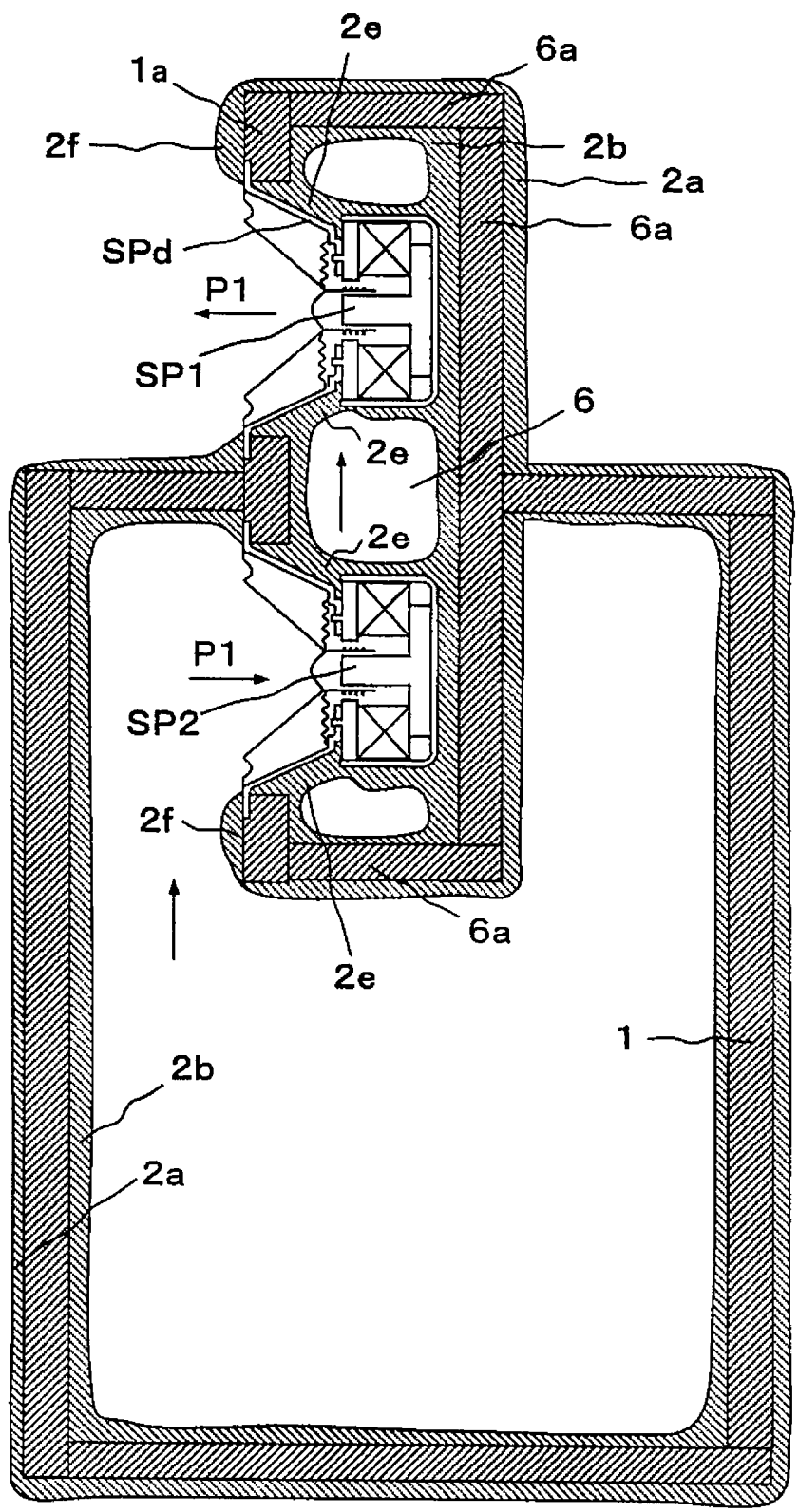
FIG. 18 is a drawing showing a loudspeaker system structure according to the embodiment 15-1 of the present invention, thereof the formation of the common sound chamber 6 by two speaker unit, the up and down arrangement with the same direction is shown.

FIG. 18 is a representation of the cross-sectional structure of the loudspeaker system according to the embodiment 15. The embodiment 15 is a loudspeaker system using two loudspeaker units is arranged with near contiguity in the same direction, to form a common sound chamber from back area of the sound emission loudspeaker to back area of the internal loudspeaker, by reverse phase polarity driven, to connect from front area of the internal loudspeakers to the cabinet area. The common sound chamber 6 formed between SP2 and SP1 loudspeaker units adjacent, isolated with the cabinet vibration and the sound emission loudspeaker unit SP1 is made, the common sound chamber 6 becomes noise canceling state as the back assist, also the reduction of action and reaction vibration P6 is done by driving in the opposite direction of the two loudspeaker units each other, and to improve the quality of the emitted sound is made. And the reduction of the common sound chamber 6 vibration and the cabinet vibration P3 are so necessary, forming 2*a*•2*b*•2*e*•2*f* of the viscoelastic material layer of claim 12 is also illustrated in this FIG. The advantage of this arrangement is the closest distance between the two loudspeaker units and it is easy to manufacture because of the two loudspeaker units in the box. There are also a point that is easy to reinforcement because of simple structure and a point that it is easy to apply the viscoelastic material. However, with respect to action and reaction vibration, for SP1 and SP2 is the P1 of each the offsetting effect is decreased because it is not on the same axis, so rotation moment but remain, this deal is performed utilizing the heavy weight of embodiment 2. In FIG. 18 using a thermos and wide-mouth glass jar in a cabinet, by arranging to adapt the caliber PVC pipe joint to the loudspeaker mounting portion of the circular SP2, if damping between inside and outside is sufficient viscoelastic material layer, so easy production, lightweight, good low bass sound reproduction and small, the loudspeaker system is realized.

Embodiment 16

Figure 19:
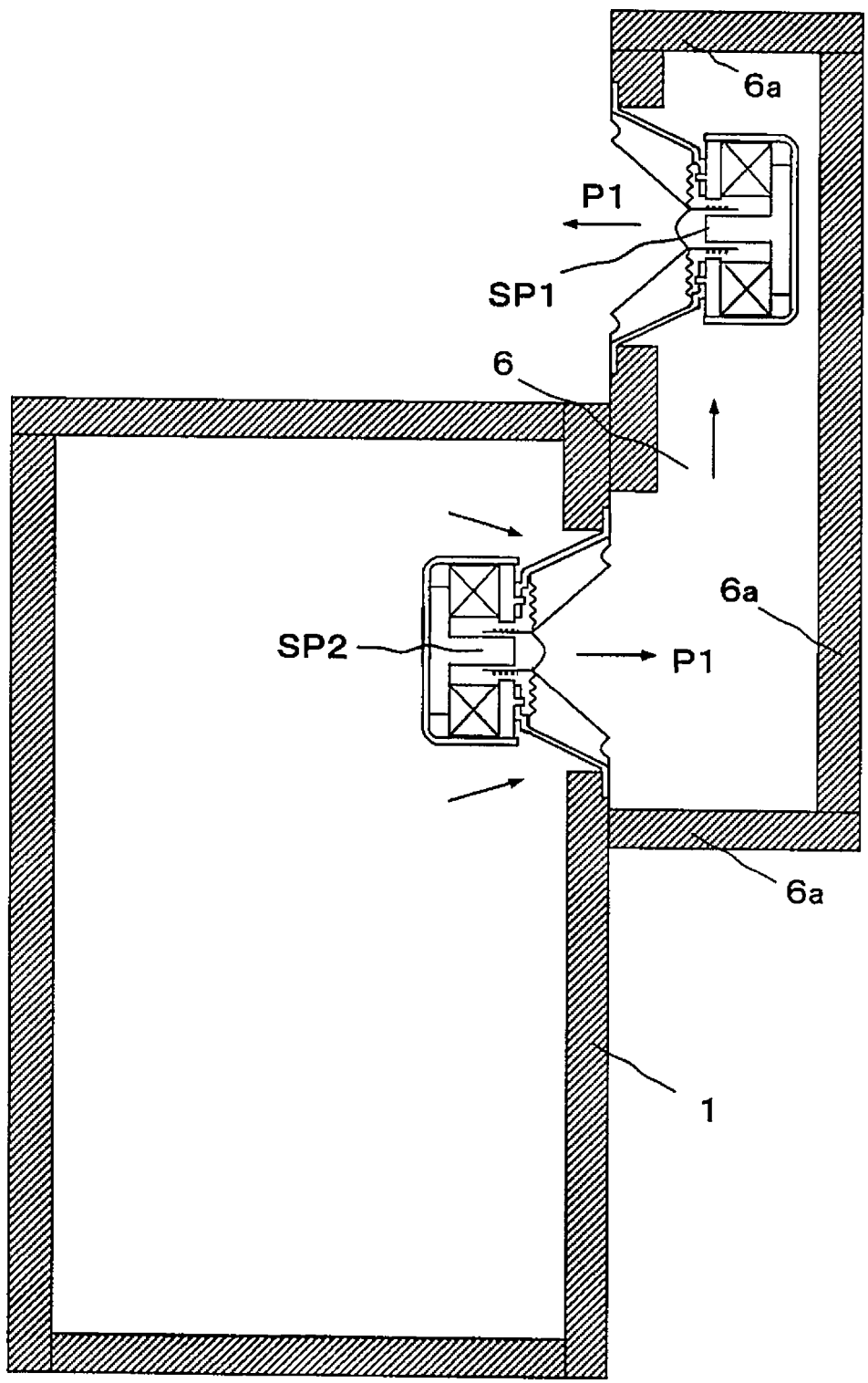
FIG. 19 is a drawing showing a loudspeaker system structure according to the embodiment 16 of the present invention, thereof the formation of the common sound chamber 6 by two speaker unit, the up and down arrangement with the reverse direction is shown.

FIG. 19 is a representation of the cross-sectional structure of the loudspeaker system according to the embodiment 16 of the present invention. The embodiment 16 is a loudspeaker system, the two loudspeaker units are arranged with near contiguity in the opposite direction, to form a common sound chamber from back area of the front side sound emission loudspeaker to back area of the internal loudspeaker, by same phase polarity driven, to connect from front area of the internal loudspeakers to the cabinet area. The common sound chamber 6 formed between the loudspeaker unit SP1 and SP2 is isolated between the cabinet vibration and the front loudspeaker unit SP1, and the common sound chamber 6 becomes noise canceling state by the back assist, further the reduction of the action and reaction vibration P6 is performed by driving in the opposite direction to each other two speaker units, and to improve the quality of the emitted sound is made. About this arrangement the two loudspeaker units is for the same polarity operation so then not be the offset of edge distortion, the vibration suppression by the box enclosure to the loudspeaker unit becomes difficult, but there is a big advantage. It is that the improvement by the addition to the current products loudspeaker system can be. The loudspeaker system that has been used for many years, if SP1 box is taken with before that, the direction exiting the sound is made back to front, the effects are obtained close to the embodiment 15, in the kit for this arrangement the effective use of the own loudspeaker system, so the advent of the latest loudspeaker and the distortion cancellation can be realized. On this occasion, for correction, such as the efficiency of the loudspeaker, the adjustment due to the resistance of the first embodiment 14 is valid. Therefore the isolation and reduction of the adverse effects of the cabinet vibration is made, the mitigation of adverse effects of action and reaction is also made, so the emitted sound quality is improved.

Embodiment 17

Figure 20:
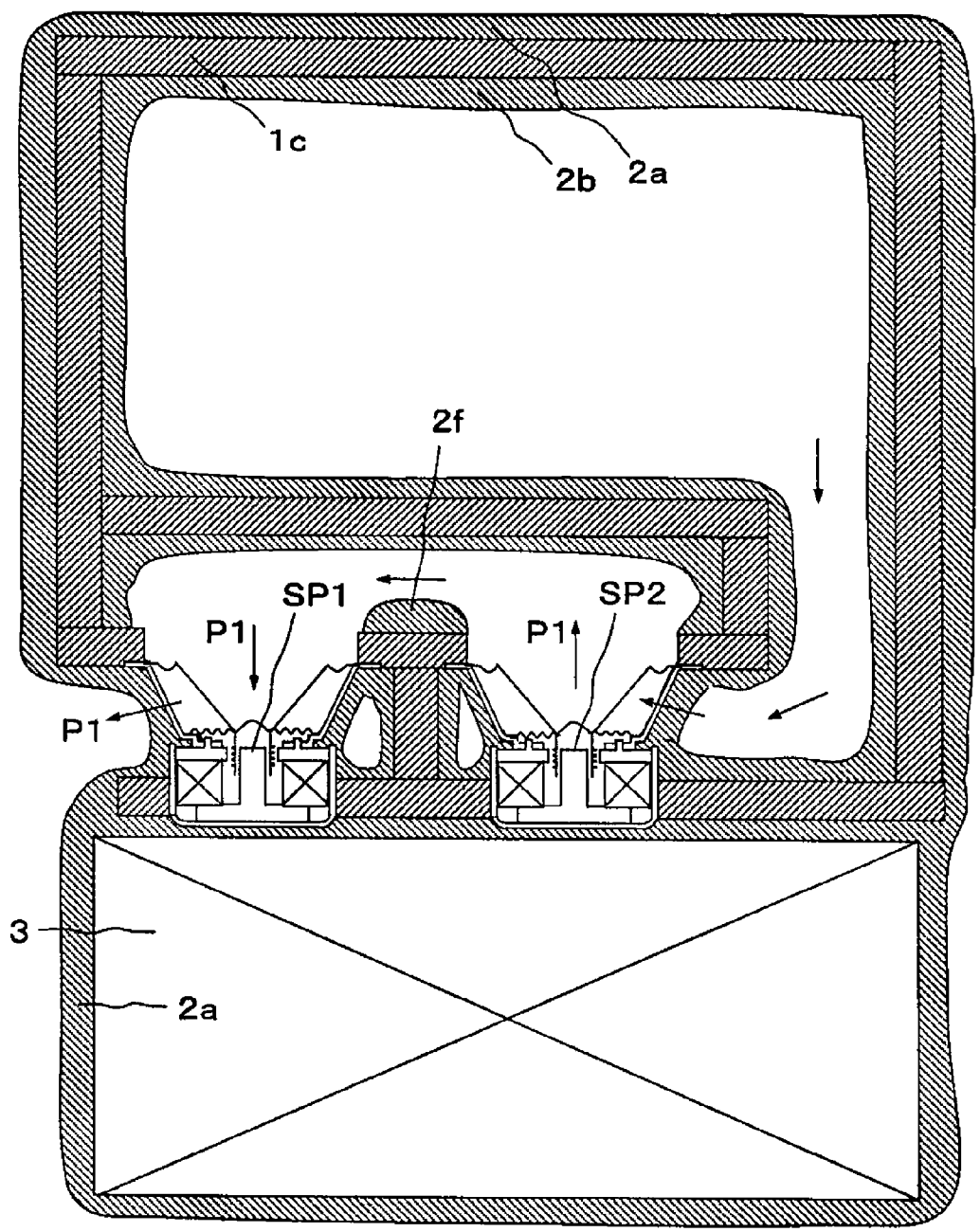
FIG. 20 is a drawing showing a loudspeaker system structure according to the embodiment 17 of the present invention, thereof by the opposite arrangement of rearside-front sound outside emission of the loudspeaker unit to the normal direction, the formation of the common sound chamber 6 by two speaker units, the up and down arrangement with the same direction, and the arrangement of heavy weight 3 are shown.

FIG. 20 is a representation of the cross-sectional structure of the loudspeaker system according to the embodiment 17 of the present invention. The embodiment 11 is a loudspeaker system, and the two loudspeaker units is arranged with near contiguity reverse arrangement in the same direction, to form a common sound chamber from front area of the back side sound emission loudspeaker to front area of the internal loudspeaker, by reverse phase polarity driven, to connect from front area of the internal loudspeakers, to the cabinet area, This feature is obtained soundscape of omnidirectional since the arrangement of the direction opposite to the loudspeaker unit SP1, moreover, in this arrangement the loudspeaker unit if it is located below, so can be disposed a heavy large as shown in FIG., the rotational moment about the offset of action and reaction in the vibration between SP1 and SP2 can be resolved adequately, and the ideal of generation of the sound vibration from the stationary point, the isolation and cabinet vibration, the vibrating cone vibration assist, these the three points are performed. The arrangement of the loudspeaker units, is formed also in the formation of the common sound chamber of the simple short distance, if the strong structure and the well damping due to the viscoelastic material layer, therefore the sound emission is achieved splendid little distortion crisply. Further in the case of reverse use of the loudspeaker unit, it is a reverse direction of the vibration damper of the vibrating cone is vibrating cone direction, the impact to the sound emission is small because of the large sound transparency of the damper, the blocking of the sound is expected to be arranged by a disk-shaped hollowed out center member attached frame in the vicinity loudspeaker damper.

Embodiment 18

Below is a description of the embodiment 18 of the present invention.

Figure 21:
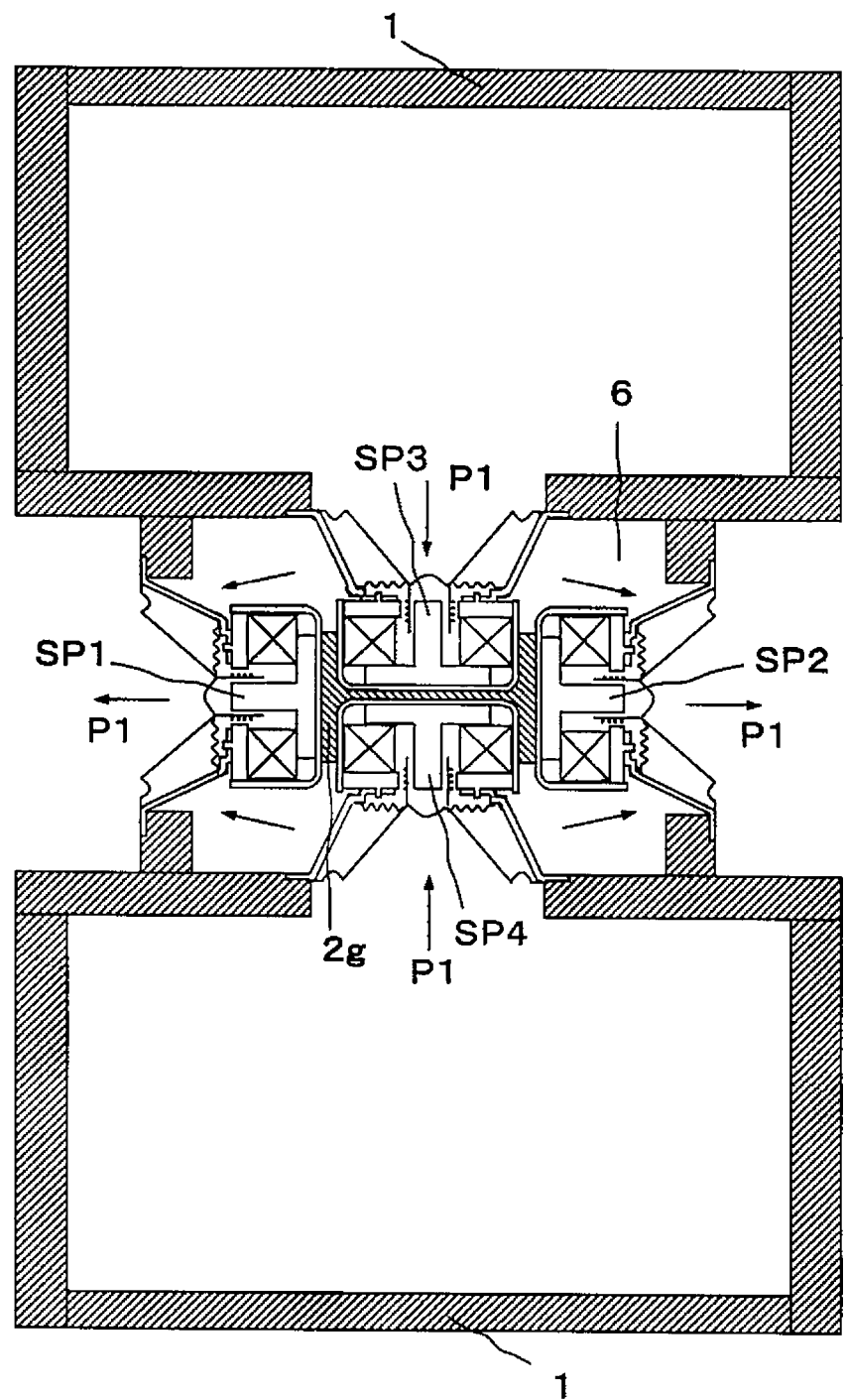
FIG. 21 is a drawing showing a loudspeaker system structure according to the embodiment 18-1 of the present invention, thereof the formation of the common sound chamber by back-to-back portion of the four loudspeaker units, and to the sound emission outside the front of the one pair loudspeaker units by driving in positive phase polarity, to the cabinet the front of the another one pair loudspeaker units by driving in reverse phase polarity, is shown.
Figure 22:
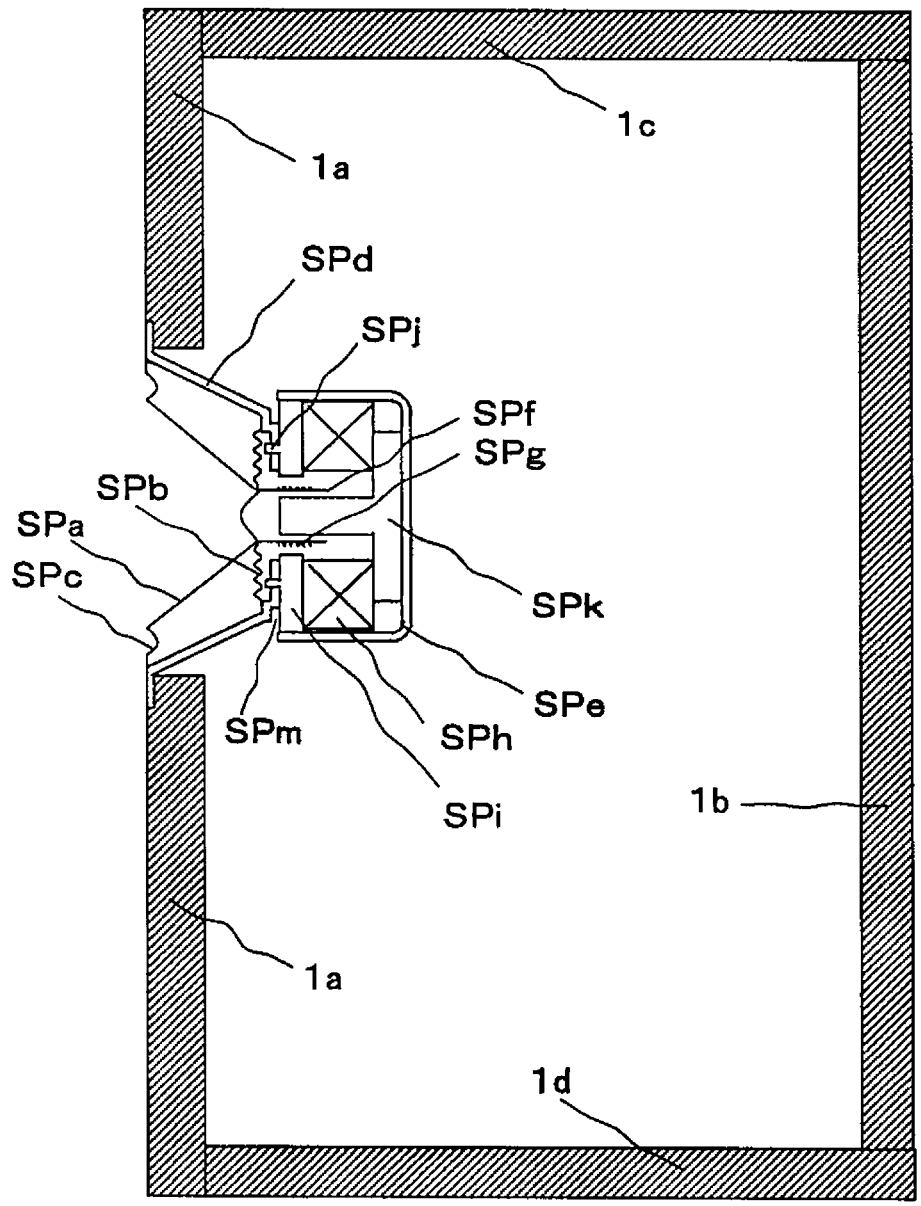
FIG. 22 is a drawing showing a loudspeaker system structure, thereof the loudspeaker unit and the cabinet of the sealed style general loudspeaker system is shown.

FIG. 21 is a representation of the cross-sectional structure of the loudspeaker system according to the embodiment 18. The embodiment 18 is a loudspeaker system arranged in back-to-back each loudspeaker unit two pairs, a common sound chamber of the four loudspeaker units back area, to form the front side sound emission loudspeakers one pair by positive phase polarity driven, to connect from front area of the internal loudspeakers one pair to cabinet area by reverse phase polarity driven. This feature is a symmetrical including air load with respect to each loudspeaker unit structurally, it is best arranged offset with respect to the vibration action and reaction. In this example also, the need to reduce vibration is made by the formation of viscoelastic material layer on the wall inside and outside and strengthening of rigidity, and the isolation and the mitigation of adverse effects of cabinet vibration is progress by the above developments, the mitigation of adverse effects of action and reaction is also made, so the release sound less strain crisply is realized. The emission direction of the sound is a two-way, therefore the arranging the reflecting plate to turn in one direction, or it may be used as a non-directional manner as to emit sound vertically up and down directions.

From the above examples, the reduction of distortion due to multiple loudspeaker arrangement in accordance with a preferred embodiment of the present invention, it indicates that it is useful to realize the original performance of the loudspeaker vibrating cone has, so this will realize the original value of the current loudspeaker unit. Using the number of loudspeaker units is doubled, then one is for internal use so efficiency down, but the high sound quality is obtained is a value hard to place anything else. Especially, if it is heard in the town and general home, is a priority sound quality than volume, that there are various embodiments is that deployment corresponding to that if possible, is a realization of the high quality sound than conventional in the general band products and the small loudspeaker system for PC, and in high class band products it is realization of the sound more realistic. And further, the high quality sound is made by the loudspeaker added to an existing loudspeaker system, the realization of both of life extension and satisfaction of the loudspeaker system is made. With the society as well as aging, the role of satisfaction of mind about the sound is large, so goodness of the sound becomes comfort and an increase of charm to life. The present invention of effective utilization of multiple loudspeaker also promote further progress, such as the vibrating cone, the vibration mechanism and the integration of multiple speaker.

DESCRIPTION OF THE REFERENCE CHARACTERS

1 loudspeaker cabinet
1*a* cabinet front baffle
1*b* cabinet rear panel
1*c* cabinet top panel
1*d* cabinet bottom panel
1*e* cabinet front baffle's small constituent material
1*f* cabinet rear panel's small constituent material
1*g* cabinet top panel's small constituent material
1*h* cabinet bottom panel's small constituent material
SP loudspeaker unit
SPa loudspeaker vibrating cone
SPb loudspeaker cone rear suspension damper
SPc loudspeaker cone front suspension surround
SPd loudspeaker frame
SPe loudspeaker magnet cover SPf loudspeaker voice coil bobbin
SPg loudspeaker voice coil
SPh loudspeaker magnet
SPi loudspeaker top plate
SPj loudspeaker rivet part
SPk loudspeaker yoke
SPm loudspeaker frame hollow part
SP2 loudspeaker unit 1
SP2 loudspeaker unit 2
SP3 loudspeaker unit 3
SP4 loudspeaker unit 4
P air vibration
P1 front air vibration of loudspeaker vibrating cone by loudspeaker vibrating cone vibration
  The case of forward arrow from loudspeaker vibrating cone is a positive phase connection and the movement indicates plus applied at plus terminal, and the case of reverse arrow from loudspeaker vibrating cone is a reverse phase connection and the movement indicates minus applied at plus terminal, and another arrows are air movements, too.
P2 rear air vibration of loudspeaker vibrating cone by loudspeaker vibrating cone vibration
P3 loudspeaker vibrating cone edge and damper vibrations and front baffle vibration by the magnet action and reaction vibration
P4 cabinet surplus vibration; by air propagation from cabinet inside air vibration P2 by loudspeaker vibrating cone vibration, and by body propagation from front baffle vibration P3
P5 loudspeaker vibrating cone vibration applied from cabinet inside air vibration P2, from cabinet surplus vibration P4
P6 magnet vibration by action and reaction vibration from loudspeaker vibrating cone vibration
2 viscoelastic material layer
2a cabinet outer surface's viscoelastic material layer
2b cabinet inner surface's viscoelastic material layer
2c cabinet each junction's viscoelastic material layer
2d cabinet each panel's viscoelastic material layer among subdivided members
2e loudspeaker unit rear side's viscoelastic material layer
2f nearby loudspeaker unit mount area's viscoelastic material layer
3 heavy weight
4a binding member
4b tension applied member
4c space member
4d through-hole for restraining members
4e auxiliary member in viscoelastic material layer of loudspeaker unit frame
4f auxiliary member in viscoelastic material layer of loudspeaker baffle
5a pot shaped stainless thermos
5b wide mouth stainless thermos
5c viscoelastic material layer of stainless thermos inside
5d viscoelastic material layer of stainless thermos outside
5e base of stainless thermos
5f bellows-shaped elastic duct
5g viscoelastic material layer of bellows-shaped elastic duct outside
5h bellows duct enclosing box
6 common sound chamber
6a baffle of sound chamber

The invention claimed is:

1. A loudspeaker system comprising:
  a loudspeaker unit composed of a loudspeaker vibrating cone, a loudspeaker frame and a magnet;
  a viscoelastic material layer formed by viscoelastic material selected from viscoelasticity sealing material of denaturation silicone or polyurethane, or viscoelastic adhesive of denaturation epoxy, denaturation silicone epoxy, urethane or any mixture thereof, with the thickness of 1 mm or more in the region of more than 70% of the total area of the loudspeaker frame back side surface and the magnet back side surface,
  wherein the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 2 mm or more with the entire annular larger 40 mm more than the loudspeaker unit mounting portion of the loudspeaker unit on the mounting baffle inside surface.

2. The loudspeaker system according to claim 1, wherein an auxiliary member having rigidity is included in the viscoelastic material layer formed on the baffle inside surface.

3. The loudspeaker system according to claim 1, further comprising: four or more loudspeaker units placed in back-to-back each speaker unit two pairs thereof, a common sound chamber of the four loudspeaker units back area, to form the front side sound emission loudspeakers one pair by positive phase polarity driven, to connect from front area of the internal loudspeakers one pair, to cabinet area by reverse phase polarity driven, and to form the viscoelastic material layer with a thickness of 1 mm or more of the loudspeaker frame back side surface and the magnet back side surface for each.

4. A loudspeaker system comprising:
  a loudspeaker unit composed of a loudspeaker vibrating cone, a loudspeaker frame and a magnet;
  a viscoelastic material layer formed by viscoelastic material selected from viscoelasticity sealing material of denaturation silicone or polyurethane, or viscoelastic adhesive of denaturation epoxy, denaturation silicone epoxy, urethane or any mixture thereof, with the thickness of 1 mm or more in the region of more than 70% of the total area of the loudspeaker frame back side surface and the magnet back side surface,
  wherein the viscoelastic material layer made of the viscoelasticity sealing material of denaturation silicone or polyurethane, or viscoelastic adhesive of denaturation epoxy, denaturation silicone epoxy, urethane or any mixture thereof, is formed with a thickness of 2 mm or more with the entire annular larger 40 mm more than the loudspeaker unit mounting portion of the loudspeaker unit on the mounting baffle outside surface.

5. The loudspeaker system according to claim 4, wherein an auxiliary member having rigidity is included in the viscoelastic material layer formed on the baffle outside surface.

6. A loudspeaker system comprising:
  a plurality of loudspeaker units, at least one loudspeaker unit composed of a loudspeaker vibrating cone, a loudspeaker frame and a magnet;
  a viscoelastic material layer formed by viscoelastic material selected from viscoelasticity sealing material of denaturation silicone or polyurethane, or viscoelastic adhesive of denaturation epoxy, denaturation silicone epoxy, urethane or any mixture thereof, with the thickness of 1 mm or more in the region of more than 70% of the total area of the loudspeaker frame back side surface and the magnet back side surface, the plurality of loudspeaker units placed near back and forth in the same direction, to form a common sound chamber from back area of the outside sound emission loudspeaker area to back area of the internal loudspeaker, by reverse phase polarity driven, to connect from front area of the internal loudspeakers to the cabinet area, and to form the viscoelastic material layer with a thickness of 1 mm or more of the loudspeaker frame back side surface and the magnet back side surface for each.

7. A loudspeaker system comprising:
a plurality of loudspeaker units, at least one loudspeaker unit composed of a loudspeaker vibrating cone, a loudspeaker frame and a magnet;
a viscoelastic material layer formed by viscoelastic material selected from viscoelasticity sealing material of denaturation silicone or polyurethane, or viscoelastic adhesive of denaturation epoxy, denaturation silicone epoxy, urethane or any mixture thereof, with the thickness of 1 mm or more in the region of more than 70% of the total area of the loudspeaker frame back side surface and the magnet back side surface,
the plurality of loudspeaker units placed with near contiguity in the same direction, to form a common sound chamber from back area of the sound emission loudspeaker to back area of the internal loudspeaker, by reverse phase polarity driven, to connect from front area of the internal loudspeakers to the cabinet area, and to form the viscoelastic material layer with a thickness of 1 mm or more of the loudspeaker frame back side surface and the magnet back side surface for each.

8. A loudspeaker system comprising:
a plurality of loudspeaker units, at least one loudspeaker unit composed of a loudspeaker vibrating cone, a loudspeaker frame and a magnet;
a viscoelastic material layer formed by viscoelastic material selected from viscoelasticity sealing material of denaturation silicone or polyurethane, or viscoelastic adhesive of denaturation epoxy, denaturation silicone epoxy, urethane or any mixture thereof, with the thickness of 1 mm or more in the region of more than 70% of the total area of the loudspeaker frame back side surface and the magnet back side surface
the plurality of loudspeaker units placed with near contiguity in the opposite direction, to form a common sound chamber from back area of the front side sound emission loudspeaker to back area of the internal loudspeaker, by same phase polarity driven, to connect from front area of the internal loudspeakers to the cabinet area, and to form the viscoelastic material layer with a thickness of 1 mm or more of the loudspeaker frame back side surface and the magnet back side surface for each.

9. A loudspeaker system comprising:
a plurality of loudspeaker units, at least one loudspeaker unit composed of a loudspeaker vibrating cone, a loudspeaker frame and a magnet;
a viscoelastic material layer formed by viscoelastic material selected from viscoelasticity sealing material of denaturation silicone or polyurethane, or viscoelastic adhesive of denaturation epoxy, denaturation silicone epoxy, urethane or any mixture thereof, with the thickness of 1 mm or more in the region of more than 70% of the total area of the loudspeaker frame back side surface and the magnet back side surface
the plurality of loudspeaker units placed with near contiguity reverse arrangement in the same direction, to form a common sound chamber from front area of the back side sound emission loudspeaker to front area of the internal loudspeaker, by reverse phase polarity driven, to connect from front area of the internal loudspeakers, to the cabinet area, and to form the viscoelastic material layer with a thickness of 1 mm or more of the loudspeaker frame back side surface and the magnet back side surface for each.

* * * * *